US011240340B2

(12) United States Patent
Pinel et al.

(10) Patent No.: US 11,240,340 B2
(45) Date of Patent: Feb. 1, 2022

(54) OPTIMIZED DEPLOYMENT OF ANALYTIC MODELS IN AN EDGE TOPOLOGY

(71) Applicant: International Business Machines Corporation, Armonk, NY (US)

(72) Inventors: Florian Pinel, New York, NY (US); Russell Patrick Bobbitt, New York, NY (US); Donna K. Byron, Petersham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/930,258

(22) Filed: May 12, 2020

(65) Prior Publication Data

US 2021/0360082 A1 Nov. 18, 2021

(51) Int. Cl.
*H04L 29/08* (2006.01)
*G06F 11/34* (2006.01)
(Continued)

(52) U.S. Cl.
CPC ...... *H04L 67/2885* (2013.01); *G06F 11/3428* (2013.01); *H04L 41/5019* (2013.01);
(Continued)

(58) Field of Classification Search
CPC ... H04L 67/2885; H04L 67/288; H04L 67/34; H04L 41/5019; H04L 41/5096; G06F 11/3428; H04N 7/181
See application file for complete search history.

(56) References Cited

U.S. PATENT DOCUMENTS 10,051,206 B2  8/2018  Adsumilli et al.
10,116,904 B2  10/2018  Addy
(Continued)

FOREIGN PATENT DOCUMENTS

CN    110928694 B     3/2020
WO    2020014425 A1   1/2020

OTHER PUBLICATIONS

Cheng et al., "A Survey of Model Compression and Acceleration for Deep Neural Networks", (online) retrieved from the Internet Apr. 30, 2020 at URL https://arxiv.org/pdf/1710.09282.pdf, IEEE Signal Processing Magazine, Special Issue on Deep Learning for Image Understanding (Arxiv Extended Version), Total 10 pages.

(Continued)

*Primary Examiner* — Blake J Rubin
(74) *Attorney, Agent, or Firm* — Konrad, Raynes, Davda and Victor LLP; Janaki K. Davada

(57) ABSTRACT

Provided are techniques for optimized deployment of analytic models in an edge topology. A description of a multi-tiered edge topology with a plurality of nodes, a multimedia stream analytics composition, and performance objectives are received, where the multimedia stream analytics composition includes tasks that use analytic models. The analytic models are optimized and clustered to form clusters of optimized analytic models. A representative optimized analytic model is selected from each of the clusters. A configuration recommendation is determined that indicates deployment of the tasks and of each selected representative optimized analytic model on the plurality of nodes to meet the performance objectives. One or more workflows are generated from the configuration recommendation and executed on the plurality of nodes to generate output for the multimedia stream analytics composition.

24 Claims, 22 Drawing Sheets

(51) Int. Cl.
H04L 12/24 (2006.01)
H04N 7/18 (2006.01)
(52) U.S. Cl.
CPC ........ *H04L 41/5096* (2013.01); *H04L 67/288* (2013.01); *H04L 67/34* (2013.01); *H04N 7/181* (2013.01)

(56) References Cited

U.S. PATENT DOCUMENTS

| | | | |
|---|---|---|---|
| 10,123,051 | B2 | 11/2018 | Laganiere et al. |
| 10,262,019 | B1 | 4/2019 | Reiner et al. |
| 10,264,295 | B2 | 4/2019 | Dharssi et al. |
| 10,306,305 | B2 | 5/2019 | Burton et al. |
| 10,341,283 | B2 | 7/2019 | Kereth et al. |
| 10,346,347 | B2 | 7/2019 | Lu et al. |
| 2013/0147961 | A1 | 6/2013 | Gao et al. |
| 2013/0212440 | A1* | 8/2013 | Rom ................. G06F 11/3072 714/47.1 |
| 2017/0132472 | A1* | 5/2017 | Tao ........................ G06N 3/08 |
| 2017/0261949 | A1* | 9/2017 | Hoffmann .............. G06N 7/005 |
| 2018/0034922 | A1 | 2/2018 | Gopalan |
| 2018/0129892 | A1 | 5/2018 | Bahl et al. |
| 2018/0159745 | A1* | 6/2018 | Byers ...................... H04L 43/08 |
| 2018/0181842 | A1 | 6/2018 | Liao et al. |
| 2019/0034235 | A1* | 1/2019 | Yang ....................... G06Q 50/26 |
| 2019/0034799 | A1 | 1/2019 | Latapie et al. |
| 2019/0043201 | A1* | 2/2019 | Strong ............... G06K 9/00624 |
| 2019/0095787 | A1* | 3/2019 | Kung ..................... G06N 3/088 |
| 2019/0102676 | A1* | 4/2019 | Nazari ................... G06K 9/627 |
| 2019/0110002 | A1 | 4/2019 | Zhang et al. |
| 2019/0121350 | A1* | 4/2019 | Cella ....................... H04L 67/12 |
| 2019/0124346 | A1 | 4/2019 | Ren et al. |
| 2019/0140933 | A1* | 5/2019 | Guim Bernat .......... H04L 43/08 |
| 2019/0141340 | A1 | 5/2019 | Reddiar et al. |
| 2019/0251369 | A1* | 8/2019 | Popov .................... G06K 9/342 |
| 2019/0278976 | A1* | 9/2019 | Khadloya ............. G06K 9/6262 |
| 2019/0339688 | A1* | 11/2019 | Cella ............... G05B 19/41865 |
| 2019/0347548 | A1* | 11/2019 | Amizadeh ............ G06N 3/0445 |
| 2019/0378074 | A1* | 12/2019 | Mcphatter .......... G06Q 10/0637 |
| 2020/0013159 | A1* | 1/2020 | Ito ......................... H04N 7/181 |
| 2020/0143241 | A1* | 5/2020 | Gao ....................... G06K 9/628 |
| 2020/0193296 | A1* | 6/2020 | Dixit ....................... G06K 9/62 |
| 2020/0225996 | A1* | 7/2020 | Sharma .................... G06N 3/04 |
| 2020/0301685 | A1* | 9/2020 | Verma ...................... G06F 8/60 |
| 2020/0380306 | A1* | 12/2020 | Hada .................... G06N 3/0481 |
| 2020/0387713 | A1* | 12/2020 | Kanthan ............ G06K 9/00765 |
| 2021/0014114 | A1* | 1/2021 | Doshi ................. H04L 41/5019 |
| 2021/0014547 | A1* | 1/2021 | Vieron ............... H04N 21/2405 |
| 2021/0064884 | A1* | 3/2021 | Elgamal ............... G06K 9/6256 |
| 2021/0200610 | A1* | 7/2021 | Chu ......................... G06N 3/08 |
| 2021/0232773 | A1* | 7/2021 | Wang ...................... G06N 3/08 |

OTHER PUBLICATIONS

IBM, "Architecting at the Edge", (online), retrieved from the Internet on May 7, 2020 at URL https://www.ibm.com/cloud/blog/architecting-at-the-edge. Total 8 pages.

Wikipedia, "Constrained Optimization" (online) retrieved from the Internet on Apr. 30, 2020 at URL https://en.wikipedia.org/wiki/Constrained_optimization, Total 7 pages.

Ran et al., "DeepDecision: A Mobile Deep Learning Framework for Edge Video Analytics" (online) retrieved from the Internet on Apr. 30, 2020 at URL http://www.cs.ucr.edu/~jiasi/pub/deepdecision_infocom18.pdf, Total 9 pages.

Held et al., "Learning to Track at 100 FPS with Deep Regression Networks" dated Aug. 16, 2016, (online) retrieved from the Internet at URL https://arxiv.org/abs/1604.01802, Total 26 pages.

Li et al., "JALAD: Joint Accuracy- and Latency-Aware Deep Structure Decoupling for Edge-Cloud Execution" dated 2018, IEEE ICPADS 2018—The 24th International Conference on Parallel and Distributed Systems (available at URL https://arxiv.org/pdf/1812.10027.pdf), Total 8 pages.

Liu et al., "Edge Assisted Real-time Object Detection for Mobile Augmented Reality", dated Oct. 2019, Total 16 pages (availabele at URL http://www.winlab.rutgers.edu/~luyang/papers/mobicom19_augmented_reality.pdf).

Redmon et al., "YOLOv3: An Incremental Improvement" dated Apr. 8, 2018, (online) retrieved from the Internet at URL https://arxiv.org/abs/1804.02767, Total 6 pages.

"What's A GPU Camera And Would You Want One?" (online) retrieved from the Internet on May 7, 2020 at URL https://www.boulderai.com/whats-a-gpu-camera-and-why-would-you-want-one, Total 5 pages.

He et al., "AMC: AutoML for Model Compression and Acceleration on Mobile Devices", 2018, (online) retrieved from the Internet on Apr. 30, 2020 at URL https://eccv2018.org/openaccess/content_ECCV_2018/papers/Yihui_He_AMC_Automated_Model_ECCV_2018_paper.pdf, Total 17 pages.

NVIDIA® Jetson Nano™ Camera, (online) retrieved from the Internet on May 7, 2020 at URL https://www.e-consystems.com/nvidia-cameras/jetson-nano-cameras/3mp-mipi-camera.asp, Total 6 pages.

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Computer Security Division Information Technology Laboratory National Institute of Standards and Technology, Total 7 pages.

Bano et al.; "ViComp: Composition Of User-Generated Videos", Multimedia Tools And Applications, vol. 75, Issue 12, pp. 7187-7210, Published online Jun. 9, 2015.

Chen et al.; "From Data To Knowledge: Deep Learning Model Compression, Transmission And Communication", MM'18 26th ACM Inter. Conf. On, pp. 1625-1633, Oct. 22-26, 2018.

Chen et al.; "Intermediate Deep Feature Compression: The Next Battlefield Of Intelligent Sensing", Cornell University Library, arXiv:1809.06196v1, 11 Pages,Sep. 17, 2018.

Jain et al.; "Scaling Video Analytics Systems To Large Camera Deployments", Cornell University Library, arXiv:1809.02318v1, 8 Pages, Sep. 7, 2018.

International Search Report and Written Opinion for International Application No. PCT/IB2021/053514, 9 pp., dated Aug. 12, 2021. [ISR & WO (57.461PCT)].

* cited by examiner

FIG. 11

Tiered Multimedia Stream Analytics Composition Execution (camera 1) — 1100

Camera 1: Optimized Analytic Models $M_1\ M_2\ M_3$, Compression $C^1_1\ C^1_2\ C^1_3$ → Images, $f^1_1$ fps + Metadata →

On-prem server at location $L_1$: Optimized Analytic Models $M_1\ M_2\ M_3$, Compression $C^3_1\ C^3_2\ C^3_3$

| Camera 1 | On-prem server |
|---|---|
| Run every image through first half of multimedia stream analytics composition to generate first metadata | |
| Send the first metadata for each image to next tier | |
| | Forward the first metadata for each image to next tier |
| Send subset of images at rate of $f^1_1$ fps to next tier. Frame rate may vary depending on the collected metadata (e.g., send more images when objects are detected) | |
| | Run each image from the subset through remaining part of multimedia stream analytics composition to generate second metadata |
| | Merge the first metadata and the second metadata |
| | If errors found in the merged metadata, send corrections to previous tier |
| Resend previous images for merged metadata correction, correct any metadata on subsequent images | |

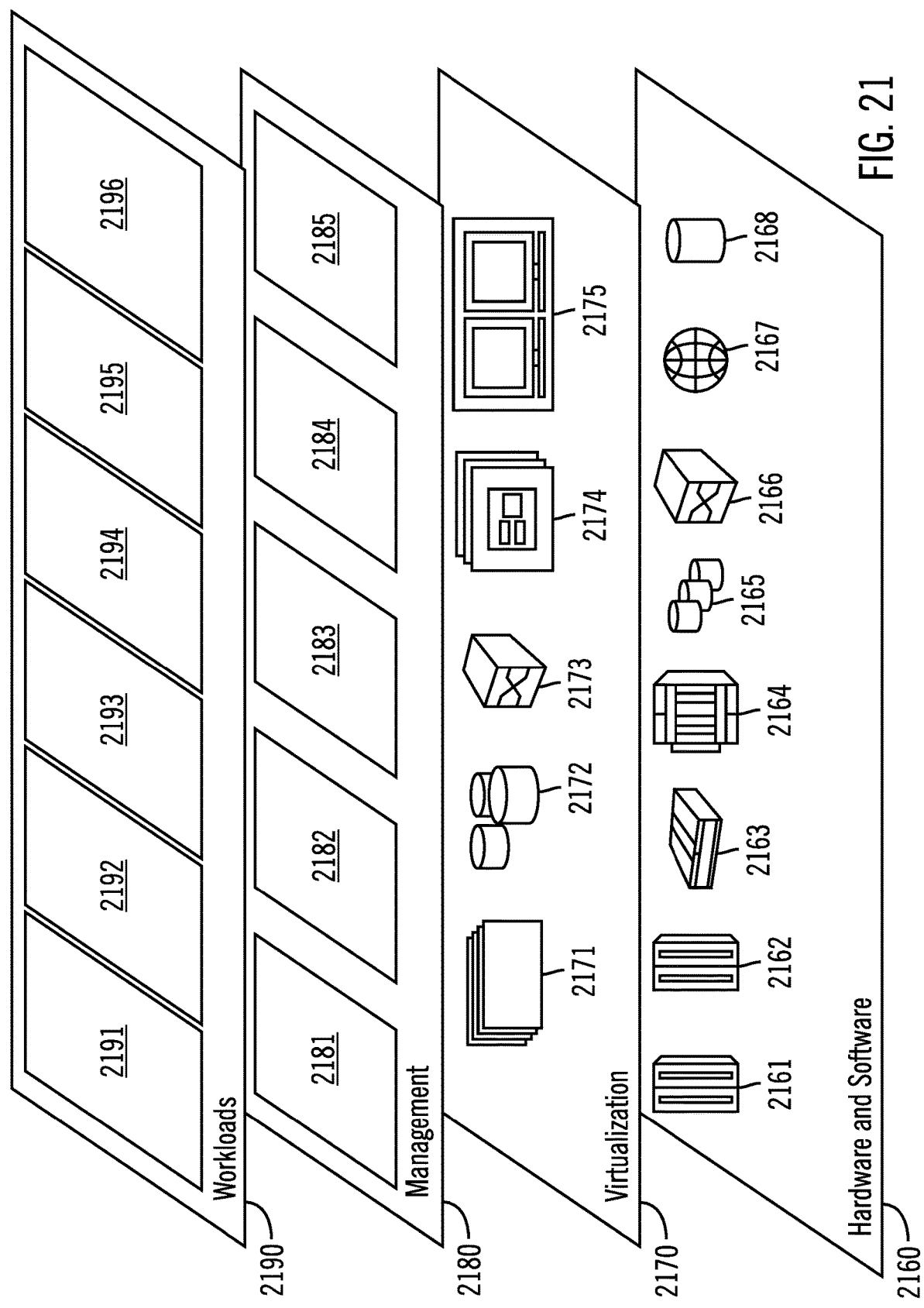

OPTIMIZED DEPLOYMENT OF ANALYTIC MODELS IN AN EDGE TOPOLOGY

BACKGROUND

Embodiments of the invention relate to optimized deployment of analytic models in an edge topology. For example, embodiments of the invention relate to recommending optimal compressed configurations for analytic model compositions in a multi-tiered edge topology.

Edge computing may be described as a distributed computing environment that brings data analysis/processing and data storage closer to the location where it is needed to improve response times and save bandwidth. With the emergence of smart cameras and small, single-board computers with camera add-ons, some video analytics capabilities are moving to the edge. Such smart cameras and small, single-board computers with camera add-ons may be described as edge devices.

However, edge devices are usually not powerful enough to run a typical video analytics composition on a live stream on their own. Compression techniques may help run deep learning models more efficiently on edge devices, but may produce inferior results.

SUMMARY

In accordance with certain embodiments, a computer-implemented method is provided for optimized deployment of analytic models in an edge topology. The computer-implemented method comprises operations. A description of a multi-tiered edge topology with a plurality of nodes, a multimedia stream analytics composition that is executed on the plurality of nodes, and performance objectives are received, where the multimedia stream analytics composition includes tasks that use analytic models. The analytic models are optimized. The optimized analytic models are clustered to form clusters of optimized analytic models. A representative optimized analytic model is selected from each of the clusters of optimized analytic models. A configuration recommendation is determined that indicates deployment of the tasks and of each selected representative optimized analytic model on the plurality of nodes to meet the performance objectives. One or more workflows are generated to execute the tasks of the multimedia stream analytics composition on nodes of different tiers of the multi-tiered edge topology. The one or more workflows are executed on the plurality of nodes to generate output for the multimedia stream analytics composition.

In accordance with other embodiments, a computer program product is provided for optimized deployment of analytic models in an edge topology. The computer program product comprises a computer readable storage medium having program code embodied therewith, the program code executable by at least one processor to perform operations. A description of a multi-tiered edge topology with a plurality of nodes, a multimedia stream analytics composition that is executed on the plurality of nodes, and performance objectives are received, where the multimedia stream analytics composition includes tasks that use analytic models. The analytic models are optimized. The optimized analytic models are clustered to form clusters of optimized analytic models. A representative optimized analytic model is selected from each of the clusters of optimized analytic models. A configuration recommendation is determined that indicates deployment of the tasks and of each selected representative optimized analytic model on the plurality of nodes to meet the performance objectives. One or more workflows are generated to execute the tasks of the multimedia stream analytics composition on nodes of different tiers of the multi-tiered edge topology. The one or more workflows are executed on the plurality of nodes to generate output for the multimedia stream analytics composition.

In accordance with yet other embodiments, a computer system is provided for optimized deployment of analytic models in an edge topology. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A description of a multi-tiered edge topology with a plurality of nodes, a multimedia stream analytics composition that is executed on the plurality of nodes, and performance objectives are received, where the multimedia stream analytics composition includes tasks that use analytic models. The analytic models are optimized. The optimized analytic models are clustered to form clusters of optimized analytic models. A representative optimized analytic model is selected from each of the clusters of optimized analytic models. A configuration recommendation is determined that indicates deployment of the tasks and of each selected representative optimized analytic model on the plurality of nodes to meet the performance objectives. One or more workflows are generated to execute the tasks of the multimedia stream analytics composition on nodes of different tiers of the multi-tiered edge topology. The one or more workflows are executed on the plurality of nodes to generate output for the multimedia stream analytics composition.

Thus, embodiments advantageously provide a multi-tiered edge topology that allows running different parts of a multimedia stream analytics composition using different model compression settings and different frame rates in each tier of the multi-tiered edge topology. That is, embodiments select what parts of the multimedia stream analytics composition and what compression models should run where and when.

In accordance with additional embodiments, the performance objectives comprise any combination of accuracy, precision, recall, and throughput. This allows for different combinations of performance objectives to be used to customize preferences for the distribution of tasks of the multimedia stream analytics composition.

In accordance with yet additional embodiments, optimizing the analytic models comprises compressing the analytic models. This advantageously allows for compression of the analytic models for increased efficiency.

In accordance with more embodiments, the clustering is based on benchmark results, and where the benchmark results are generated by benchmark testing of the optimized analytic models using test data and the plurality of nodes in the multi-tiered edge topology. This advantageously provides a clustering technique that is based on test data and the plurality of nodes in the multi-tiered edge topology, which results in better distribution of tasks of the multimedia stream analytics composition.

In accordance with yet more embodiments, one or more of images and metadata are transmitted between the nodes of the plurality of nodes at different transmission speeds. Taking into account the different transmission speeds allows for better distribution of tasks of the multimedia stream analytics composition.

In accordance with further embodiments, for each node in the multi-tiered edge topology, an objective function is defined based on performance objectives for performance, accuracy, precision, and recall. Then, for each node, a cumulative objective function is determined based on a cumulative performance, a cumulative accuracy, a cumulative precision, and a cumulative recall. An overall objective function for the multi-tiered edge topology is created based on the cumulative objective function of each node. This advantageously generates an overall objective function for the multimedia stream analytics composition.

In accordance with yet further embodiments, the plurality of nodes includes a central server in a cloud infrastructure, where the central server stores one of images and metadata for the multimedia stream analytics composition in a data store. This advantageously allows for central storage of the images and/or metadata the multimedia stream analytics composition.

In other embodiments, a Software as a Service (SaaS) is configured to perform the operations of the method. This advantageously allows for the generation of the configuration recommendation and the one or more workflows to be performed via a service.

BRIEF DESCRIPTION OF THE SEVERAL VIEWS OF THE DRAWINGS

Referring now to the drawings in which like reference numbers represent corresponding parts throughout:

FIG. 11 illustrates, in a block diagram, operations for tiered multimedia stream analytics composition execution performed with camera 1, an on-prem server at location $L_1$, and a central server in accordance with certain embodiments.

FIG. 21 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a multi-tiered edge topology that allows running different parts of a multimedia stream analytics composition using different model optimization (e.g., compression) settings and different frame rates in each tier of the multi-tiered edge topology. Embodiments select what parts of the multimedia stream analytics composition and what optimization (e.g., compression models) should run where and when. A multimedia stream includes any combination of video, audio, closed captioning, annotations, and metadata.

Figure 1:
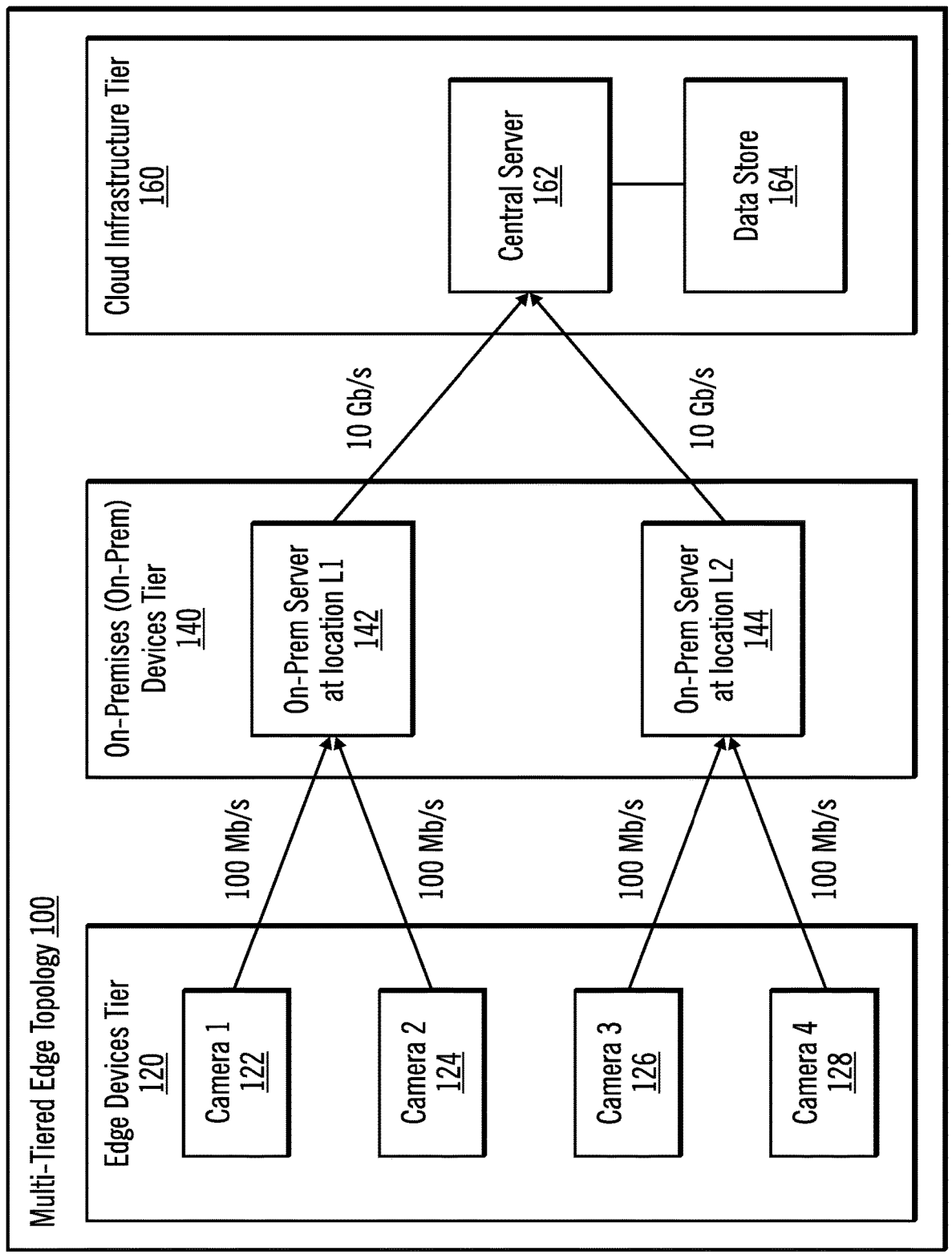
FIG. 1 illustrates, in a block diagram, a multi-tiered edge topology in accordance with certain embodiments.

FIG. 1 illustrates, in a block diagram, a multi-tiered edge topology 100 in accordance with certain embodiments. The multi-tiered edge topology 100 includes an edge devices tier 120, an on-premises (on-prem) devices tier 140, and a cloud infrastructure tier 160. The edge devices tier 120 includes cameras 122, 124, 126, 128. Each of the cameras 122, 124, 126, 128 may be a smart camera (e.g., on a smart phone, a tablet computer, a laptop, a desktop, etc.) or a small, single-board computer that includes a Graphics Processing Unit (GPU), a CPU or other chips. A GPU may be described as a specialized electronic circuit that rapidly creates and processes images. Each of the cameras 122, 124, 126, 128 outputs a multimedia stream. For the four cameras 122, 124, 126, 128, four multimedia streams are output.

The on-prem devices tier 140 includes an on-prem server at local $L_1$ (a first location) 142 and an on-prem server at location $L_2$ (a second location) 144.

The cloud infrastructure tier 160 includes a central server 162 (i.e., a cloud node) and a data store 164 (e.g., a database or other storage). The central server 162 stores images and/or metadata for the multimedia stream analytics composition in a data store. In certain embodiments, the cloud infrastructure tier allows for auto-scaling to add additional central servers to the edge topology 100. In certain embodiments, the central server 162 does not include a GPU, while in other embodiments, the central, server 162 does include a GPU.

The cameras 122, 124 transmit multimedia streams to the on-prem server at location $L_1$ 142 with a transmission speed of 100 Megabits/second (100 Mb/s). The cameras 126, 128 transmit multimedia streams to the on-prem server at location $L_2$ 144 with a transmission speed of 100 Megabits/second (100 Mb/s). The on-prem servers 142, 144 transmit multimedia streams to the central server 162 at a transmission speed of 10 Gigabytes/second (10 Gb/s). The transmission speed may also be referred to as frame rate.

The cameras 122, 124, 126, 128, the servers 142, 144, and the central server 160 may be described as devices or nodes of the multi-tiered edge topology 100.

Figure 2:
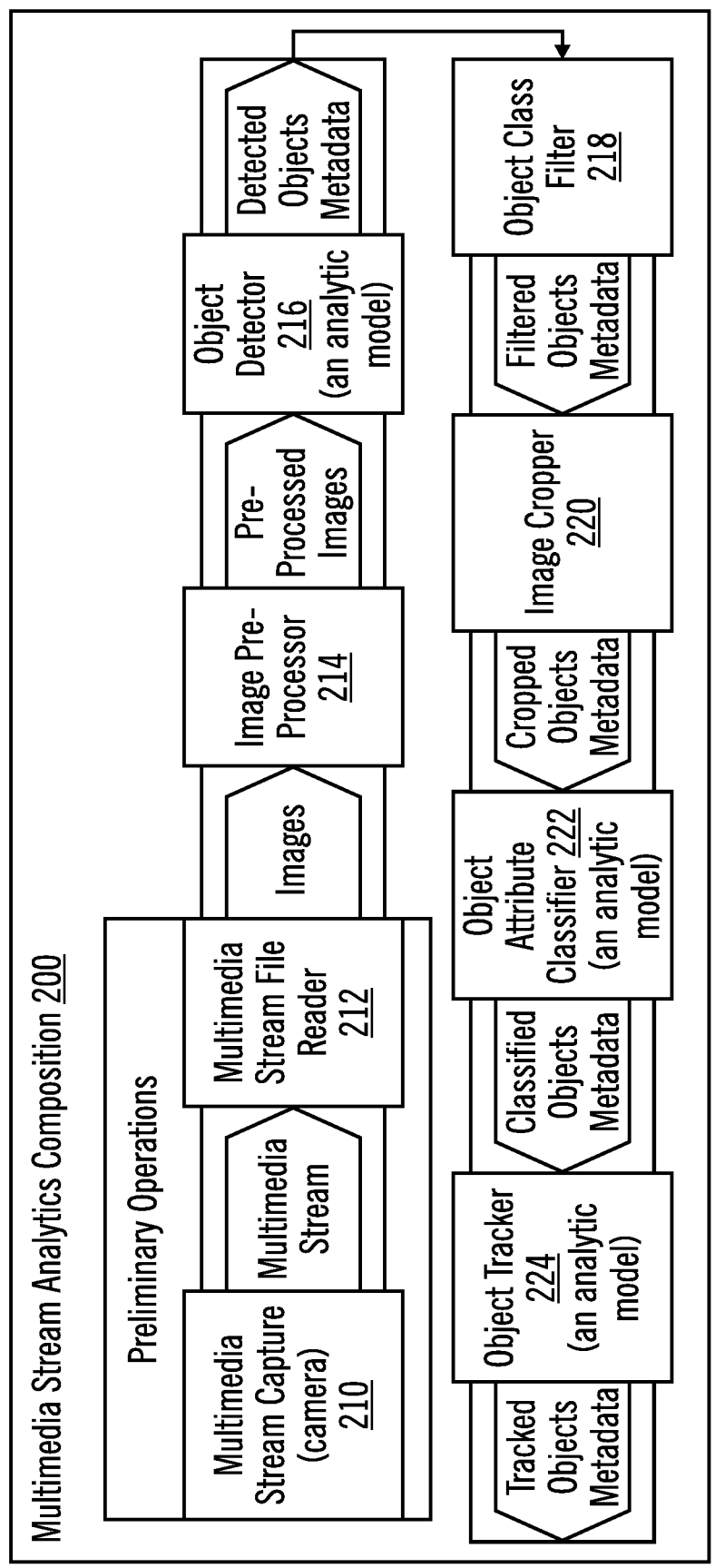
FIG. 2 illustrates a multimedia stream analytics composition process in accordance with certain embodiments.

FIG. 2 illustrates a multimedia stream analytics composition 200 in accordance with certain embodiments. The multimedia stream analytics composition 200 may be described as having tasks 210-224, where some of the tasks use analytic models. In FIG. 2 "objects metadata" may include objects and/or metadata.

The preliminary operations include multimedia stream capture 210 with a camera that outputs a multimedia stream (e.g., of two moving cars) to a multimedia stream file reader 212 that outputs images. That is, the file reader 212 decodes the multimedia stream into a sequence of raw images.

An image pre-processor 214 receives the images, performs pre-processing, and outputs the pre-processed images. The pre-processing may include one or more of: adjusting resolution, smoothing, histogram equalization, compensation for automatic gain control effects, etc. In certain embodiments, the image pre-processor 214 is an image downsampler that adjusts resolution and outputs the images with better resolution).

The object detector 216 identifies objects and metadata about the objects and outputs detected objects metadata (e.g., with bounding boxes added around each of the two cars). The object detector 216 may be an analytic model. In certain embodiments, the object detector 216 uses You Only Look Once (YOLO) object detection, which implements a Convolutional Neural Network (CNN) for object detection in real-time, by applying a single neural network to a full image, dividing the image into regions, and predicting bounding boxes and probabilities for each of the regions.

The object class filter 218 filters (removes) anything other than the objects from the detected objects metadata to output filtered objects metadata (e.g., just the two cars). The image cropper 220 may crop the images in the filtered objects metadata to output cropped objects metadata. Cropping may include extracting sub-images from the larger image, where each sub-image contains just the car and possibly some space around it. The object attribute classifier 222 (e.g., a vehicle color classifier) identifies an attribute of each of the objects in the cropped objects metadata to output classified objects metadata (e.g., that includes the colors of the two cars). The object attribute classifier 222 may be another analytic model. The object attribute classifier 222 may classify objects based on the attribute.

The object tracker 224 identifies each object in one or more frames of the classified objects metadata to output tracked objects metadata (e.g., that indicates that the first car is in frames 1-10 of the initial multimedia stream). In certain embodiments, the object tracker 224 is yet another analytic model. In certain embodiments, the object tracker 224 uses a Generic Object Tracking Using Regression Networks (GOTURN) technique.

In certain embodiments, there may be additional tasks, such as a track aggregator that receives the tracked objects metadata and performs statistical analysis across a track's lifetime (where a track describes a distinct object as it moves through frames of the multimedia stream) and outputs aggregated tracks metadata.

Each analytic model may be a deep learning model (e.g., based on artificial neural networks (e.g., Convolutional Neural Networks (CNNs)), may be an artificial intelligence model, may be analytic functions that perform functions on a multimedia stream, may be analytic compositions, etc.

Figure 3:
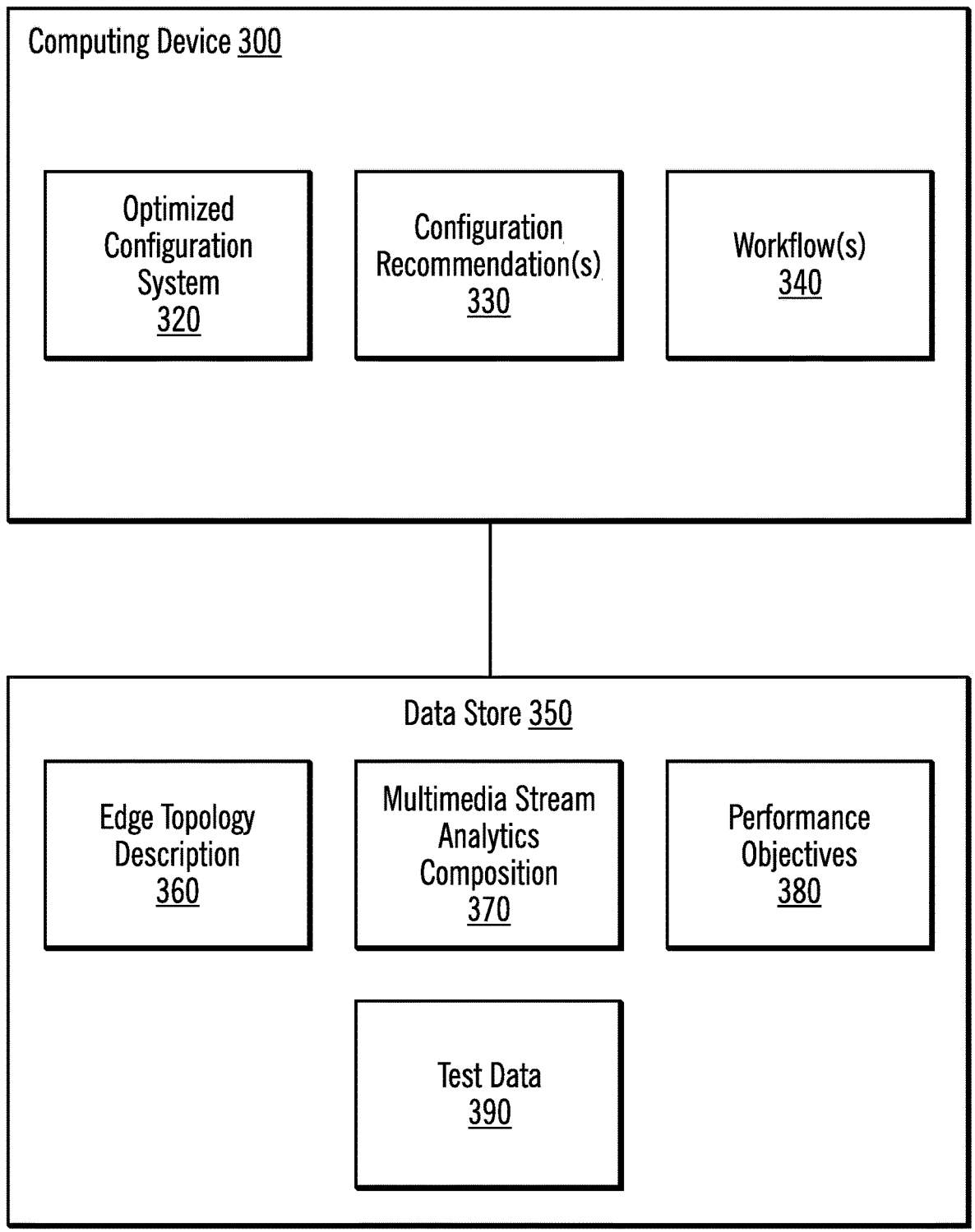
FIG. 3 illustrates, in a block diagram, a computing environment in accordance with certain embodiments.

FIG. 3 illustrates, in a block diagram, a computing environment in accordance with certain embodiments. A computing device 300 is coupled to a data store 350. The computing device 300 includes an optimized configuration system 320. The optimized configuration system 320 receives an edge topology description 360 (with hardware specifications), a multimedia stream analytics composition 370 that is to be run on the edge devices, and a set of performance objectives 380 (e.g., user constraints), and the optimized configuration system 320 outputs one or more configuration recommendations 330. The one or more configuration recommendations 330 indicate how to optimize the various analytic models used in the multimedia stream analytics composition 370, where to deploy the analytic models in the edge topology 100, and how the edge tiers 120, 140, 160 are to interact. The optimized configuration system 320 also converts the configuration recommendations 330 into one or more workflows 340 (i.e., executable workflows).

The optimized configuration system 320 performs automatic benchmarking and clustering of optimized models to reduce the number of options to consider. The optimized configuration system 320 provides a configuration recommendation 330 of a composition of analytic models for an edge topology 100. On the other hand, conventional systems are limited to variations of a single deep learning model distributed between a pair of nodes. The optimized configuration system 320 translates the configuration recommendation 330 into tier-specific workflows 340.

Figure 4A:
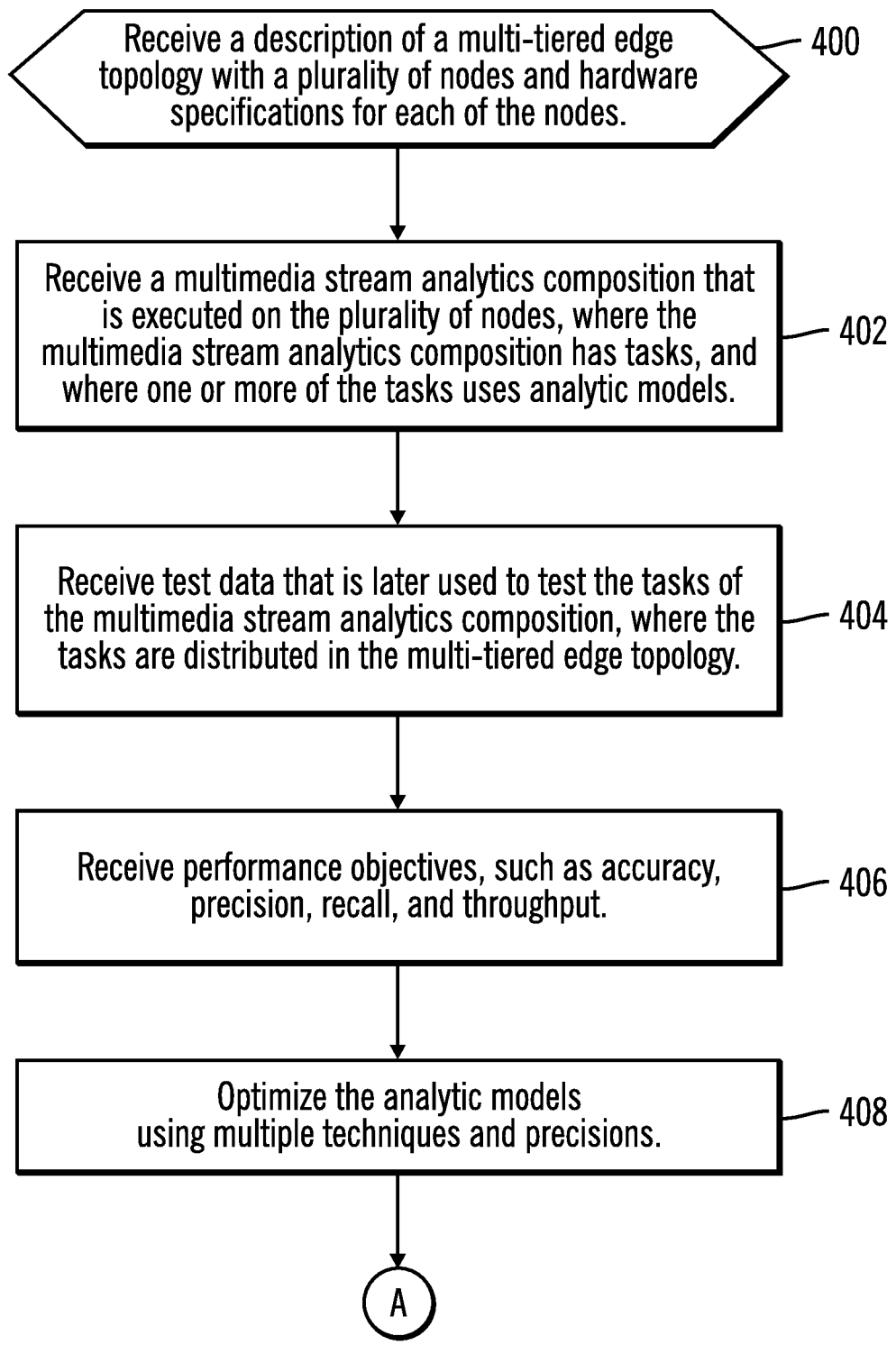
FIGS. 4A and 4B illustrate, in a flowchart, operations for generating workflows in accordance with certain embodiments.
Figure 4B:
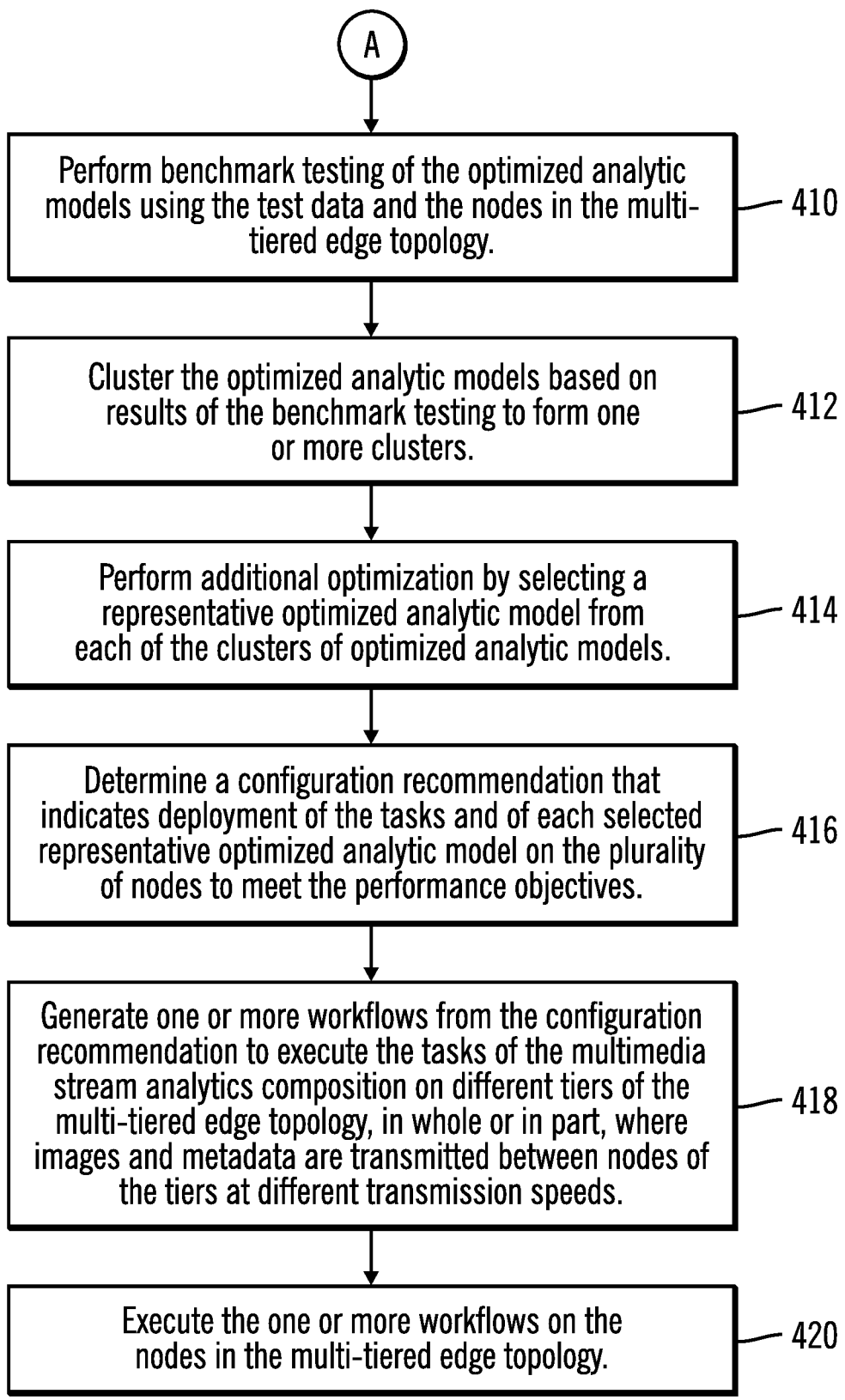

FIGS. 4A and 4B illustrate, in a flowchart, operations for generating workflows in accordance with certain embodiments. Control begins at block 400 with the optimized configuration system 320 receiving a description of a multi-tiered edge topology (i.e., an edge topology description 360) with a plurality of nodes and hardware specifications for each of the nodes. For example, a description of the multi-tiered edge topology 100 may be received.

In block 402, the optimized configuration system 320 receives a multimedia stream analytics composition 370 that is executed on the plurality of nodes, where the multimedia stream analytics composition 370 has tasks, and where one or more of the tasks uses analytic models. The multimedia stream analytics composition 200 is an example of multimedia stream analytics composition 370.

In block 404, the optimized configuration system 320 receives test data 390 that is later used to test the tasks of the multimedia stream analytics composition, where the tasks are distributed in the multi-tiered edge topology.

In block 406, the optimized configuration system 320 receives performance objectives, such as accuracy, precision, recall, and throughput (e.g., multimedia stream analytics throughput or performance). The following are performance objectives for an example provided herein:

Process at least 15 frames per second on each multimedia.
Process up to 10 objects per frame.
Recall>=0.6
Precision>=0.9
Prioritize precision over recall.
Overall latency<1 s In block 408, the optimized configuration system 320 optimizes the analytic models using multiple techniques and precisions. In certain embodiments, the optimization is compression, and techniques used for compression include, for example, parameter pruning and sharing, low-rank factorization, transferred/compact convolutional filters, and knowledge distillation. Thus, with embodiments, different types of compression may be used for different types of optimization. The multiple precisions refer to precision of the analytic model parameters (e.g., reducing float point precision from 32 to 16-bit to save on memory and increase efficiency) and size of input ("network input dimensions", with, for example, the analytic model accepting a 320×240 image instead of a 640×480 image). From block 408 (FIG. 4A), processing continues to block 410 (FIG. 4B).

In block 410, the optimized configuration system 320 performs benchmark testing of the optimized analytic models using the test data 390 and the nodes in the multi-tiered edge topology.

In block 412, the optimized configuration system 320 clusters the optimized analytic models based on results of the benchmark testing to form one or more clusters. For example, the optimized configuration system 320 may find that Cluster A has high accuracy and slow throughput, while Cluster B has low accuracy and fast throughput.

In block 414, the optimized configuration system 320 performs additional optimization by selecting a representative optimized analytic model from each of the clusters of optimized analytic models. In certain embodiments, this includes solving the constrained optimization problem (i.e., optimizing the performance objectives with respect to variables in the presence of performance objectives on those variables). In certain embodiments, this includes selecting different representative optimized analytic models from each of the clusters of optimized analytic models to determine which representative best meets the performance objectives.

In block 416, the optimized configuration system 320 provides a configuration recommendation 330 that indicates deployment of the tasks and of each selected representative optimized analytic model on the plurality of nodes to meet the performance objectives. In certain embodiments, the configuration recommendation 330 also indicates transmission speeds of communication between tiers of the multi-tiered edge topology.

In block 418, the optimized configuration system 320 generates one or more workflows from the configuration recommendation to execute the tasks of the multimedia stream analytics composition on different tiers of the multi-tiered edge topology, in whole or in part, where images and metadata are transmitted between nodes of the tiers at different transmission speeds (i.e., frame rates). That is, tasks of the multimedia stream analytics composition may be distributed across the multi-tiered edge topology (e.g., object detection on one node, object tracking on a different node, etc.), with each selected representative optimized analytic model being used by a task.

In block 420, the optimized configuration system 320 executes the one or more workflows on the nodes in the multi-tiered edge topology.

Figure 5:
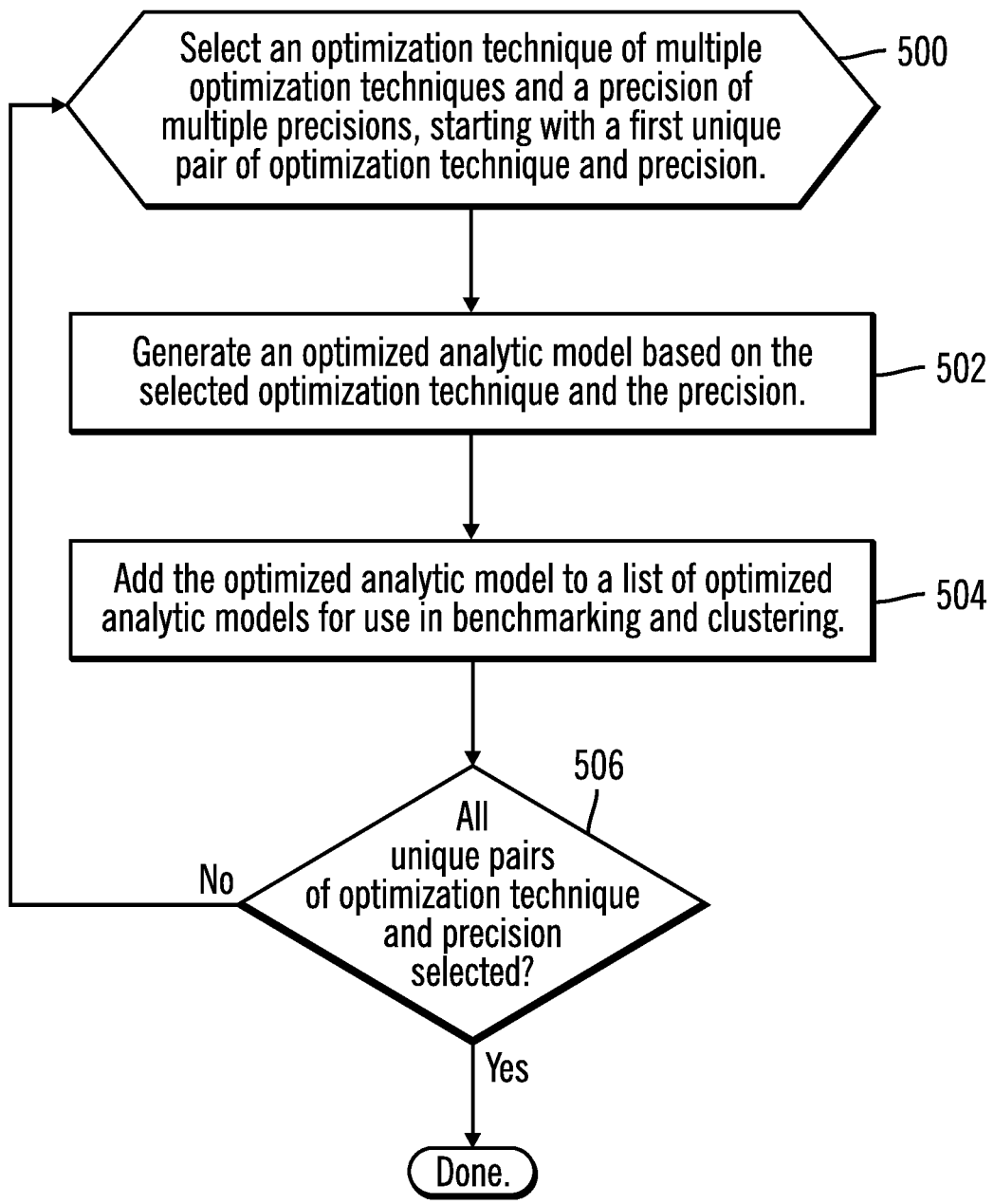
FIG. 5 illustrates, in a flowchart, operations for optimizing analytic models in accordance with certain embodiments.

FIG. 5 illustrates, in a flowchart, operations for optimizing analytic models in accordance with certain embodiments. Control begins at block 500 with the optimized configuration system 320 selecting an optimization technique of multiple optimization techniques and a precision of multiple precisions, starting with a first unique pair of optimization technique and precision. In block 502, the optimized configuration system 320 generates an optimized analytic model based on the selected optimization technique and the precision. In block 504, the optimized configuration system 320 adds the optimized analytic model to a list of optimized analytic models for use in benchmarking and clustering. In block 506, the optimized configuration system 320 determines whether all unique pairs of optimization technique and precision selected have been selected. If so, processing continues to block 500 to select another unique pair, otherwise, processing is done.

Figure 6:
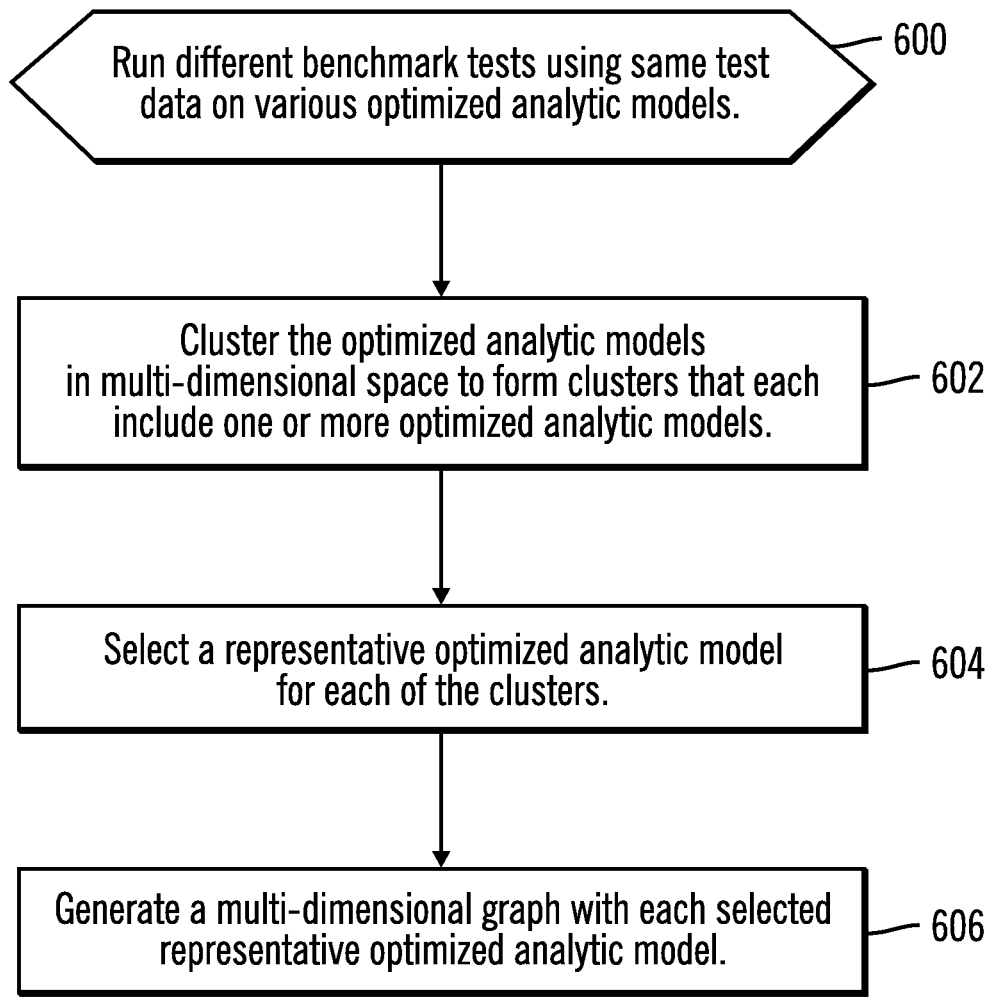
FIG. 6 illustrates, in a flowchart, operations for benchmarking and clustering in accordance with certain embodiments.

FIG. 6 illustrates, in a flowchart, operations for benchmarking and clustering in accordance with certain embodiments. Control begins at block 600 with the optimized configuration system 320 running different benchmark tests using the same test data 390 on various optimized analytic models. The various optimized analytic models may be the ones on the list of optimized analytic models. The tests provide performance, accuracy, precision, and recall (4 dimensions forming a 4-dimension space). In block 602, the optimized configuration system 320 the optimized analytic models in multi-dimensional space to form clusters that each include one or more optimized analytic models. For example, for 4 dimensions, the optimized analytic models are clustered in a 4-dimension space or in a derived lower dimensional space (e.g., a 2-dimensional space, such as performance and precision). In block 604, the optimized configuration system 320 selects a representative optimized analytic model for each of the clusters (e.g., according to utility function or target edge tier of the multi-tiered edge topology). In block 606, the optimized configuration system 320 generates a multi-dimensional graph with each selected representative optimized analytic model. For example, if there are 10 models that are placed into 4 clusters, then 4 representative optimized analytic models are selected for the graph.

Figure 7:
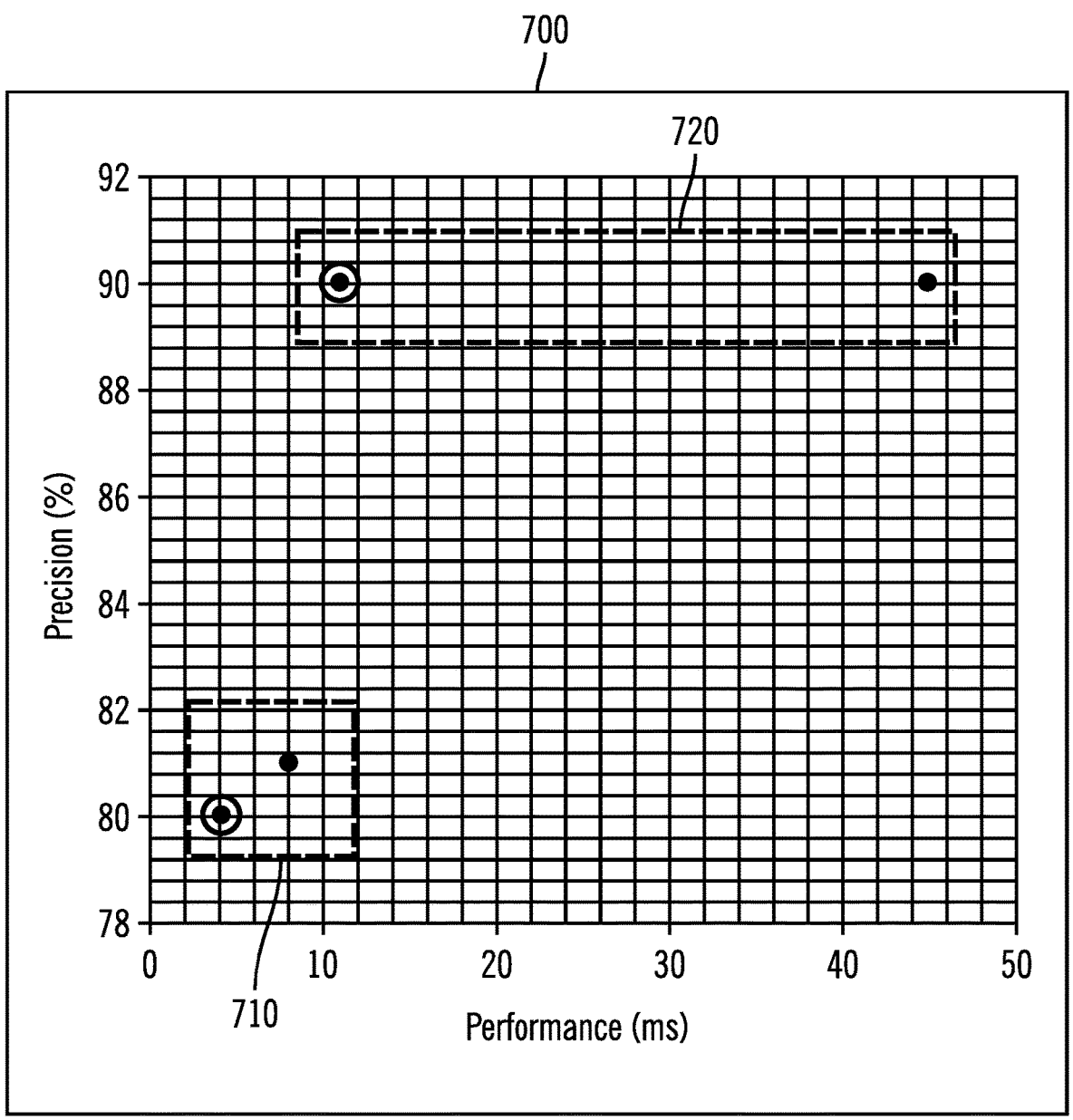
FIG. 7 illustrates a 2-dimensional graph of optimized analytic models in accordance with certain embodiments.

FIG. 7 illustrates a 2-dimensional graph 700 of optimized analytic models in accordance with certain embodiments. The graph 700 has an x-axis for performance and a y-axis for precision. Cluster 710 has low precision and low performance, while cluster 720 has high performance and high precision.

Figure 8:
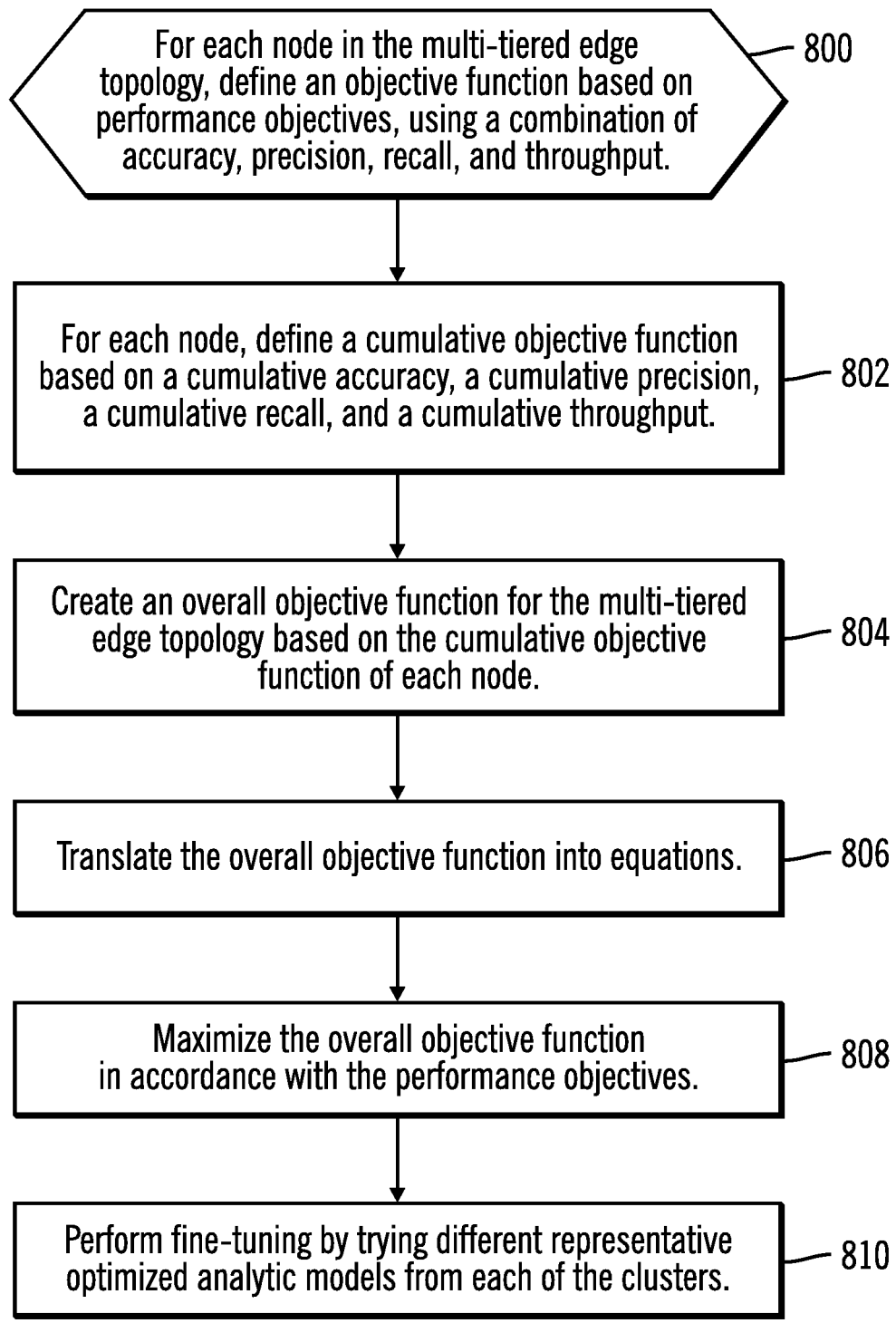
FIG. 8 illustrates, in a flowchart, operations for additional optimization in accordance with certain embodiments.

FIG. 8 illustrates, in a flowchart, operations for additional optimization in accordance with certain embodiments. Control begins at block 800 with the optimized configuration system 320, for each node in the multi-tiered edge topology, defining an objective function based on performance objectives, using a combination of accuracy, precision, recall, and throughput. For example, a user might apply a performance objective that recall is at least 0.9. Instead of stating specific accuracy metrics (of many possible accuracy metrics), the performance objective may state: "for each node, define a cumulative performance and accuracy for the entire multimedia stream analytics composition". Here throughput may be speed (e.g., maximum latency). and accuracy may be how good of a job the analytics composition is doing for the corresponding tasks (e.g., detecting at least 8 out of 10 objects of interest).

In block 802, for each node, the optimized configuration system 320 defines a cumulative objective function based on a cumulative accuracy, a cumulative precision, a cumulative recall, and a cumulative throughput. For example, the cumulative throughput may be the sum of the throughputs of the each of the analytic models in the multimedia stream analytics composition 370. In certain embodiments, accuracy may be the product of the accuracies of all the analytic models in the multimedia stream analytics composition 370.

In block 804, the optimized configuration system 320 creates an overall objective function for the multi-tiered edge topology based on (e.g., by summing) the cumulative objective functions of each node. For example, if the objective function is precision for each node, then the overall objective function is the sum of precisions from each of the nodes.

In block 806, the optimized configuration system 320 translates the overall objective function into equations. This is done to solve the constrained optimization problem. For example, the equations may be: recall>=0.6 (i.e., recall is not being optimized) and latency<1 s.

In block 808, the optimized configuration system 320 maximizes the overall objective function in accordance with the performance objectives (i.e., so that the performance objectives are respected). There may be a finite number of combinations of optimized analytic models, which are further reduced by clustering and selecting an optimized analytic model from each of the clusters.

In block 810, the optimized configuration system 320 performs fine-tuning by trying different representative optimized analytic models from each of the clusters. For example, in FIG. 6 the optimized configuration system 320 identifies clusters and selects a representative per cluster. However, there may be competing representatives in one or more clusters, such that the selected representative may not be the best selection. In block 810, other representatives are selected and the processing of FIG. 8 is performed to compare results for different selected representatives for fine-tuning.

Figure 9:
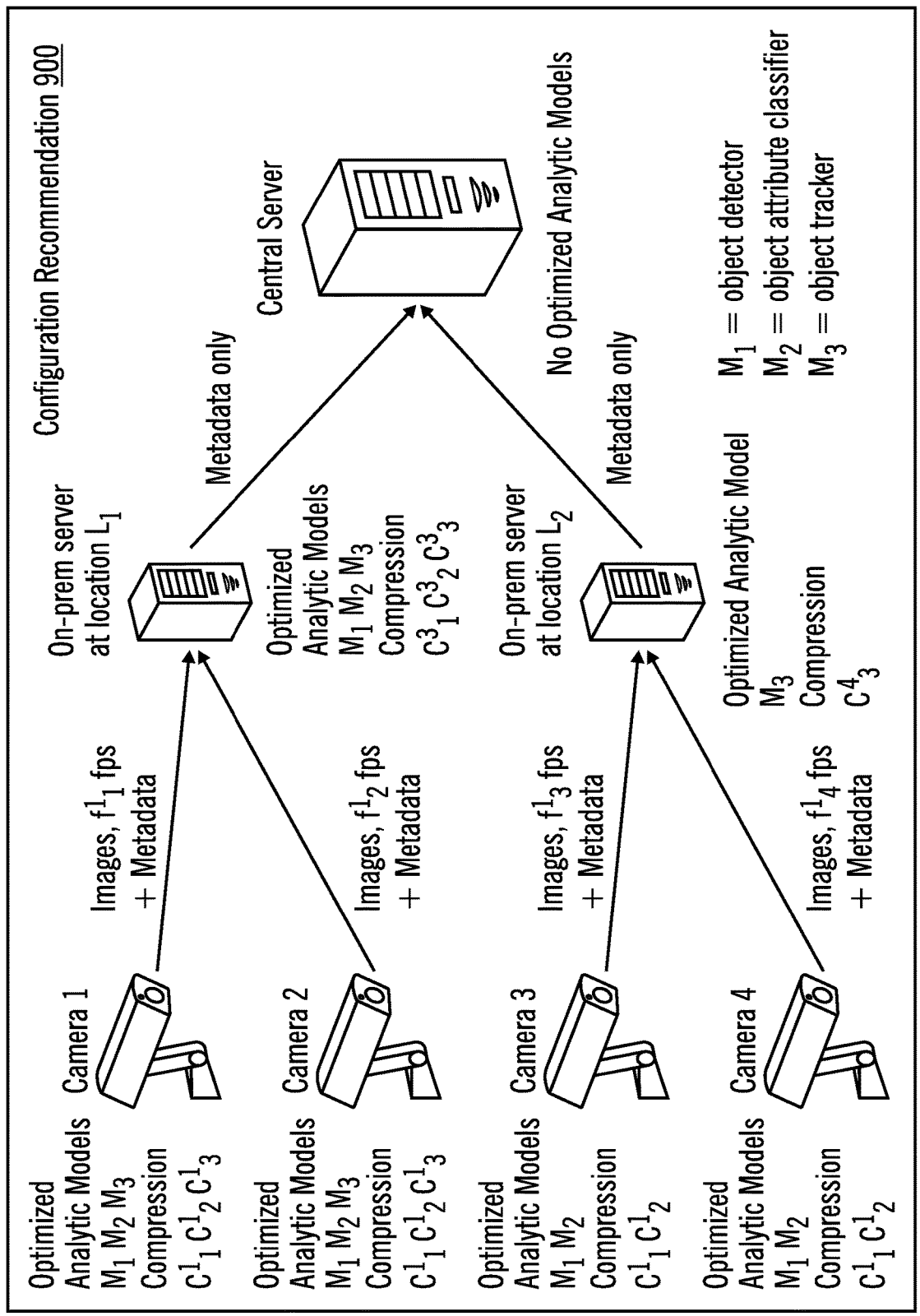
FIG. 9 illustrates, in a block diagram, an example of a configuration recommendation in accordance with certain embodiments.

FIG. 9 illustrates, in a block diagram, an example of a configuration recommendation 900 in accordance with certain embodiments. In FIG. 9, there is an optimized analytic model $M_1$ for the object detector, an optimized analytic model $M_2$ for the object attribute classifier, and an optimized analytic model $M_3$ for the object tracker. In FIG. 9, the configuration recommendation 900 indicate which nodes of each of the edge tiers of the multi-tiered edge topology should execute one or more optimized analytic models $M_1$, $M_2$, $M_3$. Also, in FIG. 9, the cameras forward images and metadata to the on-prem servers, while the on-prem servers forward metadata without images to the central server. Each of the cameras transmits at different transmission speeds (i.e., frames per second (fps) or frame rate).

Figure 10:
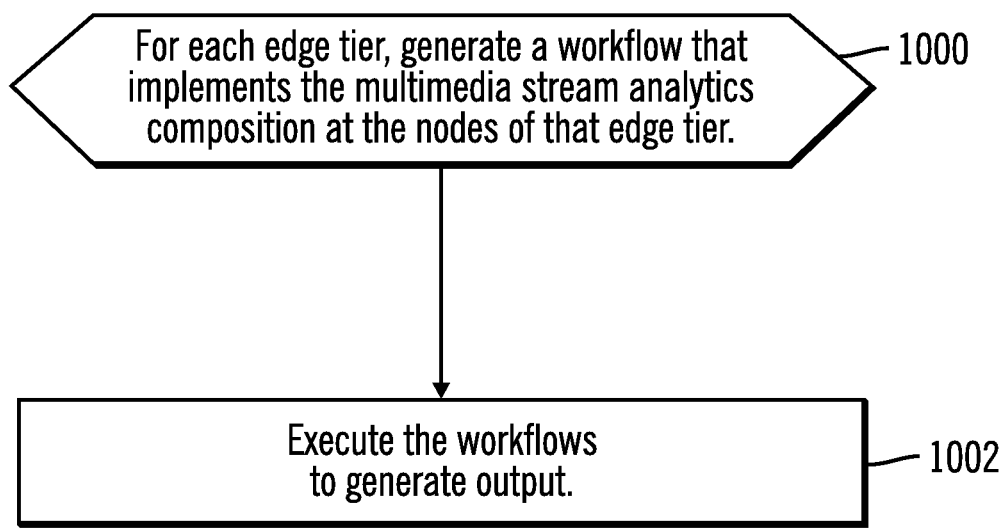
FIG. 10 illustrates, in a flowchart, operations for executing workflows in accordance with certain embodiments.

FIG. 10 illustrates, in a flowchart, operations for executing workflows in accordance with certain embodiments. Control begins at block 1000 with the optimized configuration system 320, for each edge tier, generating a workflow that implements the multimedia stream analytics composition at the nodes of that edge tier. Although the multimedia stream analytics composition is compatible with many types of multi-tiered edge topology architectures, the workflows details the actions performed by each node of each edge tier and the interactions between the different edge tiers.

In block 1002, the optimized configuration system 320 executes the workflows to generate output. In certain embodiments, the output may be aggregated tracked objects.

FIG. 11 illustrates, in a block diagram, operations for tiered multimedia stream analytics composition execution 1100 performed with camera 1, an on-prem server at location $L_1$, and a central server in accordance with certain embodiments. In this example, camera 1 performs some processing on the multimedia stream and sends output to the on-prem server at location $L_1$, and the on-prem server at location $L_1$ performs some processing and sends output to the central server. The tiered multimedia stream analytics composition execution 1100 uses optimized analytic models for the object detector, the object attribute classifier, and the object tracker.

Figure 12:
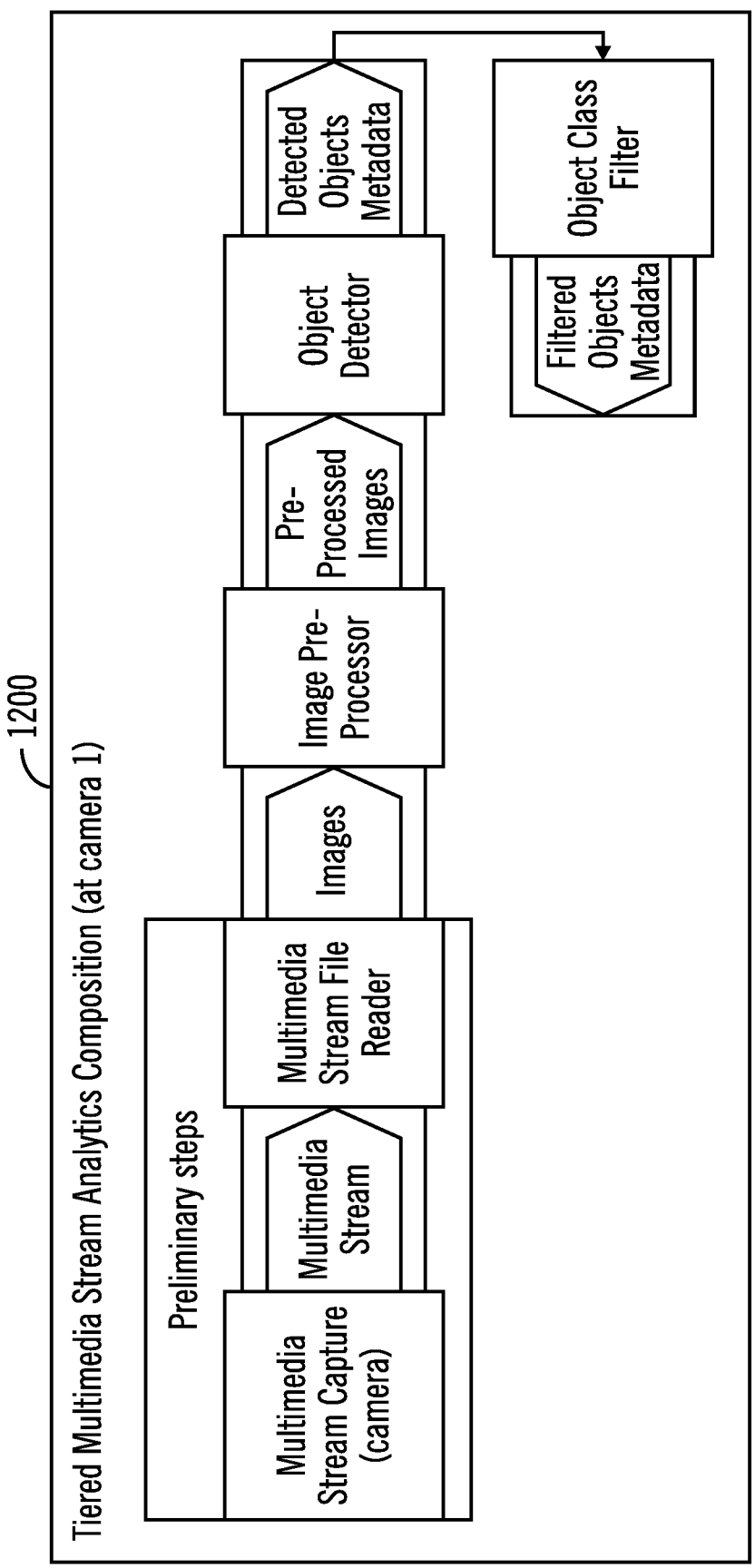
FIG. 12 illustrates, in a block diagram, tasks of a tiered multimedia stream analytics composition at camera 1 in accordance with certain embodiments.

FIG. 12 illustrates, in a block diagram, tasks 1200 of a tiered multimedia stream analytics composition at camera 1 in accordance with certain embodiments. In this example, camera 1 performs the tasks 1200 of the multimedia stream analytics composition 1100 from multimedia stream capture through object class filter and outputs filtered objects metadata to the on-prem server at location $L_1$. The tiered multimedia stream analytics composition execution uses an optimized analytic model for the object detector.

Figure 13:
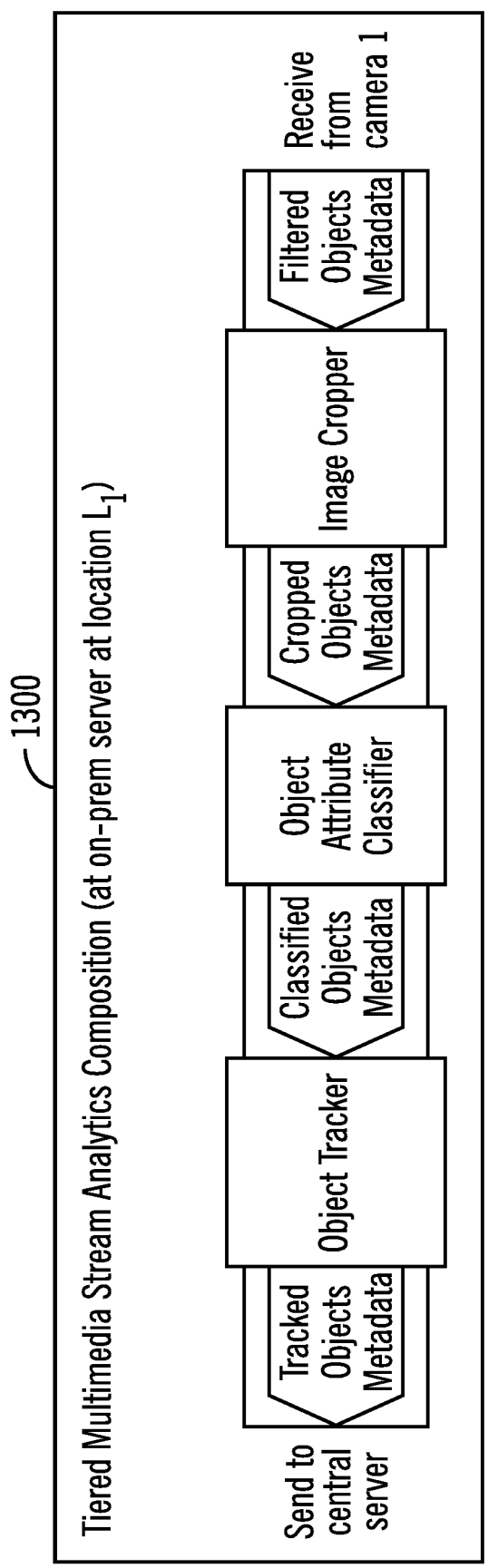
FIG. 13 illustrates, in a block diagram, tasks of the tiered composition execution at the on-prem server at local $L_1$ in accordance with certain embodiments.

FIG. 13 illustrates, in a block diagram, tasks 1300 of the tiered composition execution at the on-prem server at local $L_1$ in accordance with certain embodiments. In this example, the on-prem server at location $L_1$ receives the filtered objects metadata, performs the tasks 1300 of the multimedia stream analytics composition from image cropper through object tracker, and outputs tracked objects metadata to the central server. The tiered multimedia stream analytics composition execution uses optimized analytic models for the object attribute classifier and the object tracker.

Figure 14:
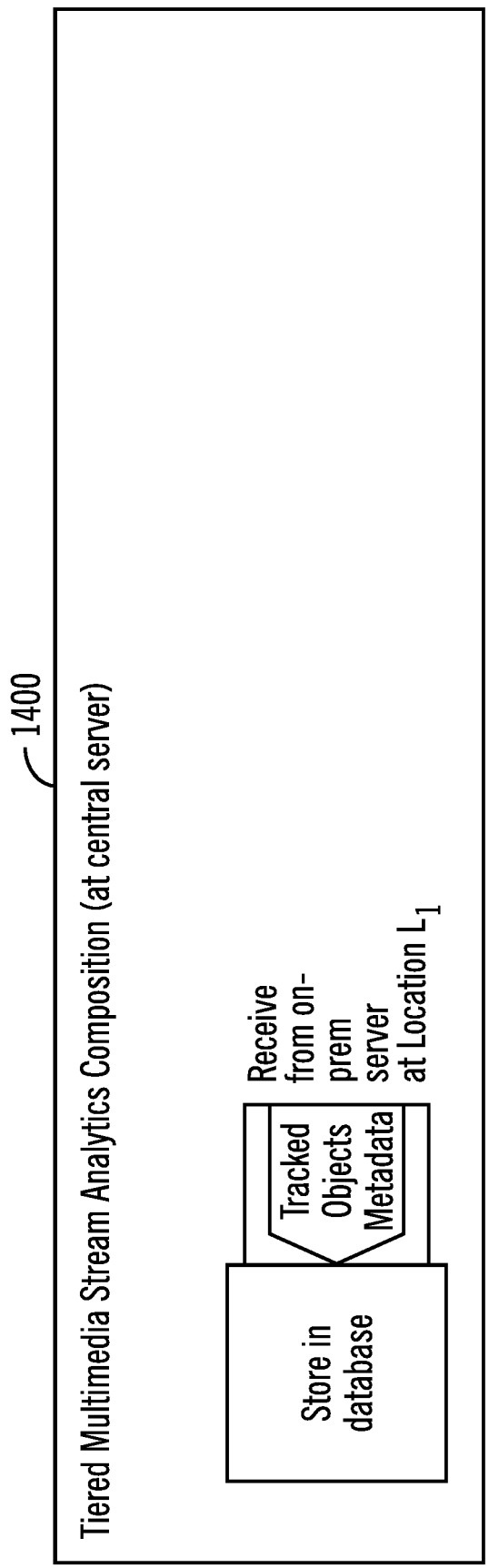
FIG. 14 illustrates, in a block diagram, tasks of the tiered composition execution at the central server in accordance with certain embodiments.

FIG. 14 illustrates, in a block diagram, tasks 1400 of the tiered composition execution at the central server in accordance with certain embodiments. In this example, the central server receives the tracked objects metadata from the on-prem server at location $L_1$ and stores the tracked objects metadata in a database.

Figure 15:
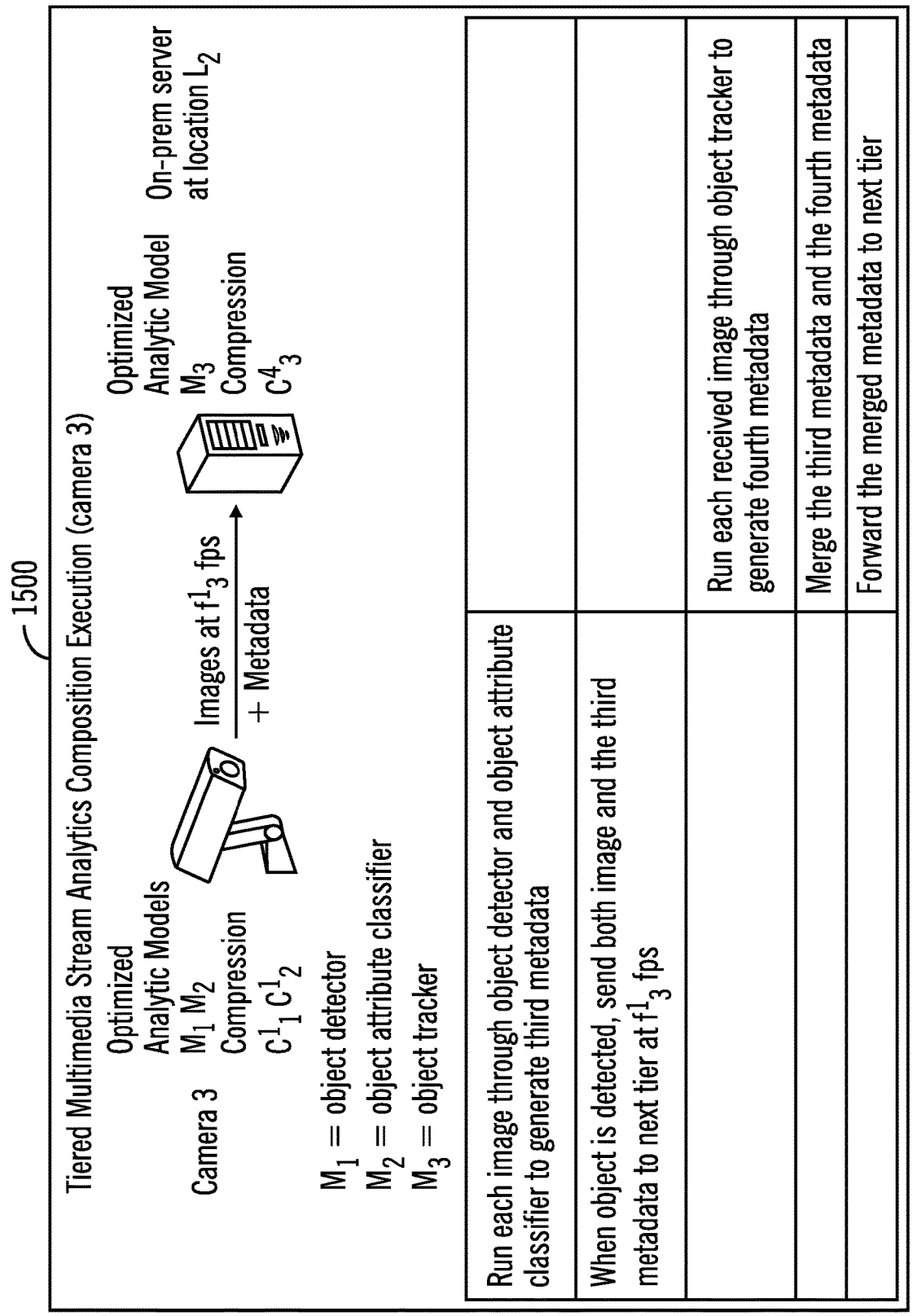
FIG. 15 illustrates, in a block diagram, operations for tiered multimedia stream analytics composition execution performed with camera 3, an on-prem server at location $L_2$, and a central server in accordance with certain embodiments.

FIG. 15 illustrates, in a block diagram, operations for tiered multimedia stream analytics composition execution 1500 performed with camera 3, an on-prem server at location $L_2$, and a central server in accordance with certain embodiments. In this example, camera 3 performs some processing on the multimedia stream and sends output to the on-prem server at location $L_2$, and the on-prem server at location $L_2$ performs some processing and sends output to the central server. The tiered multimedia stream analytics composition execution 1500 uses optimized analytic models for the object detector, the object attribute classifier, and the object tracker.

Figure 16:
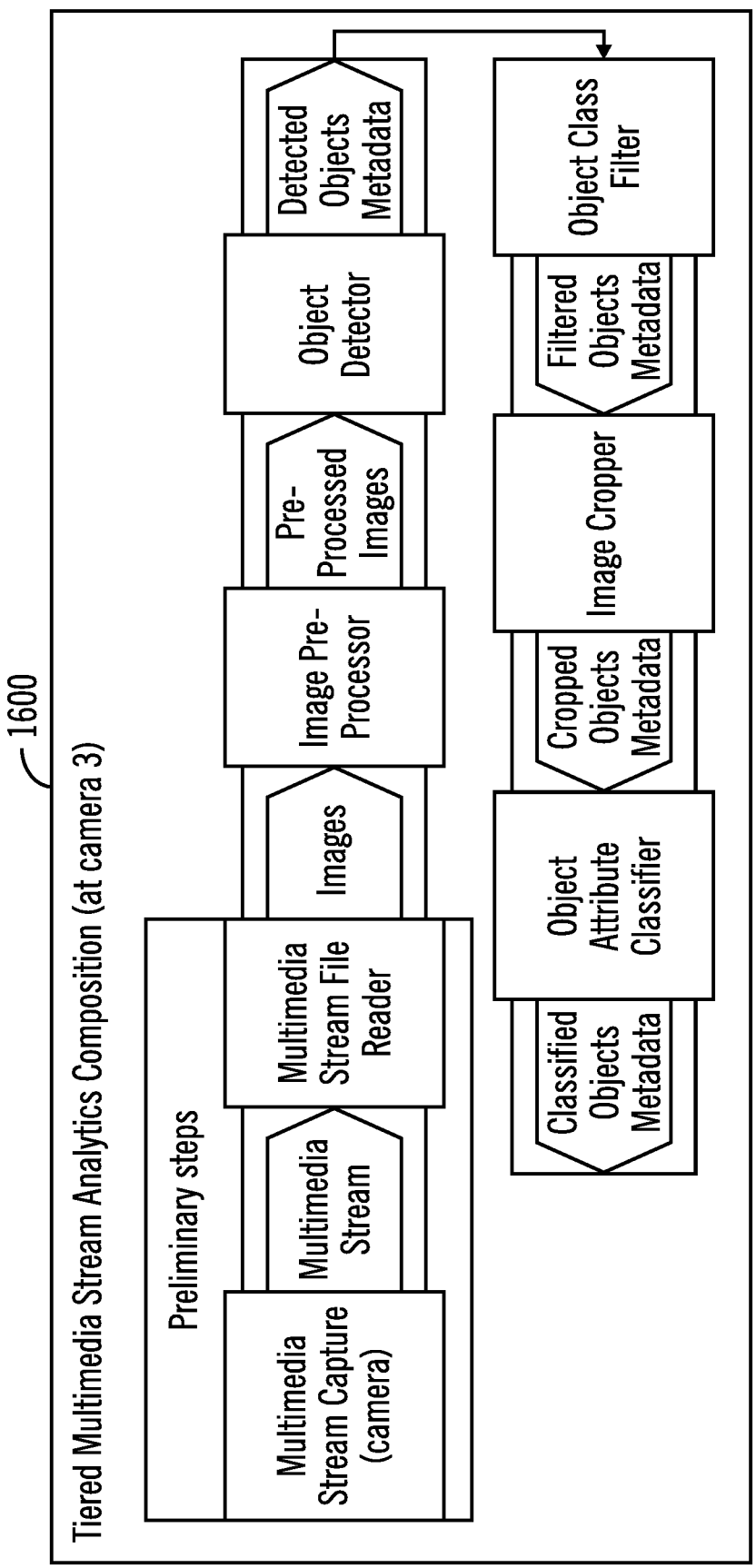
FIG. 16 illustrates, in a block diagram, tasks for the tiered multimedia stream analytics composition at camera 3 in accordance with certain embodiments.

FIG. 16 illustrates, in a block diagram, tasks 1600 for the tiered multimedia stream analytics composition at camera 3 in accordance with certain embodiments. In this example, camera 3 performs the tasks 1600 of the multimedia stream analytics composition 1500 from multimedia stream capture through object attribute classifier and outputs classified objects metadata to the on-prem server at location $L_2$. The tiered multimedia stream analytics composition execution uses optimized analytic models for the object detector and the object attribute classifier.

Figure 17:
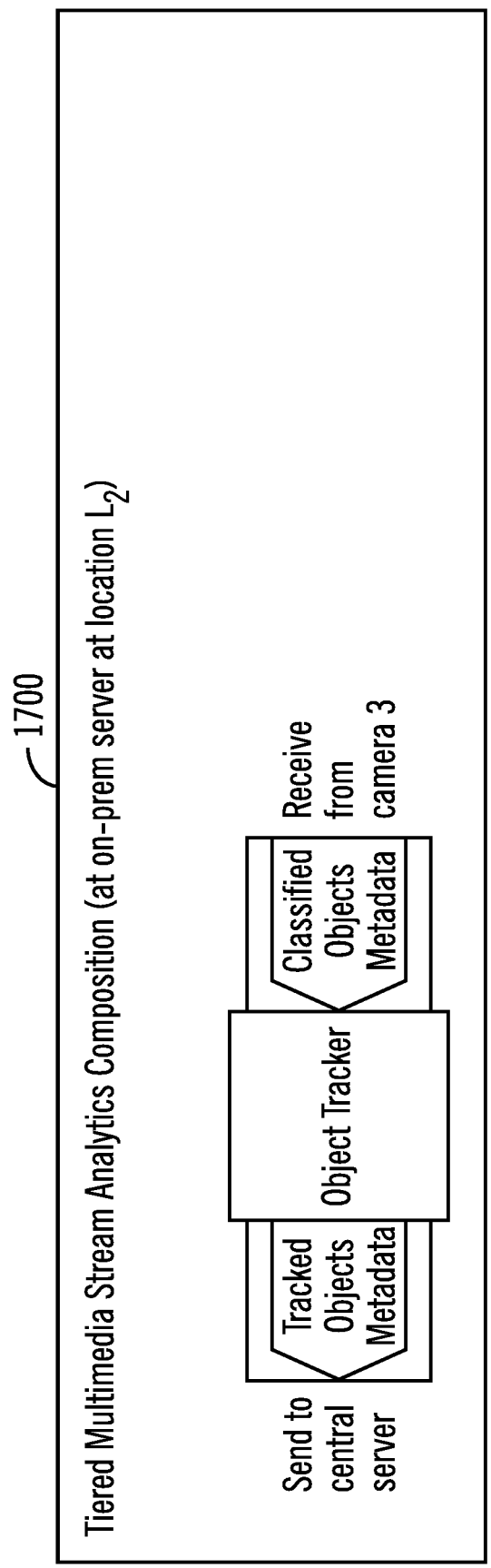
FIG. 17 illustrates, in a block diagram, tasks for the tiered composition execution at the on-prem server at local $L_2$ in accordance with certain embodiments.

FIG. 17 illustrates, in a block diagram, tasks 1700 for the tiered composition execution at the on-prem server at local $L_2$ in accordance with certain embodiments. In this example, the on-prem server at location $L_2$ receives the classified objects metadata, performs the tasks 1700 of the multimedia stream analytics composition of the object tracker, and outputs tracked objects metadata to the central server. The tiered multimedia stream analytics composition execution uses optimized analytic models for the object tracker.

Figure 18:
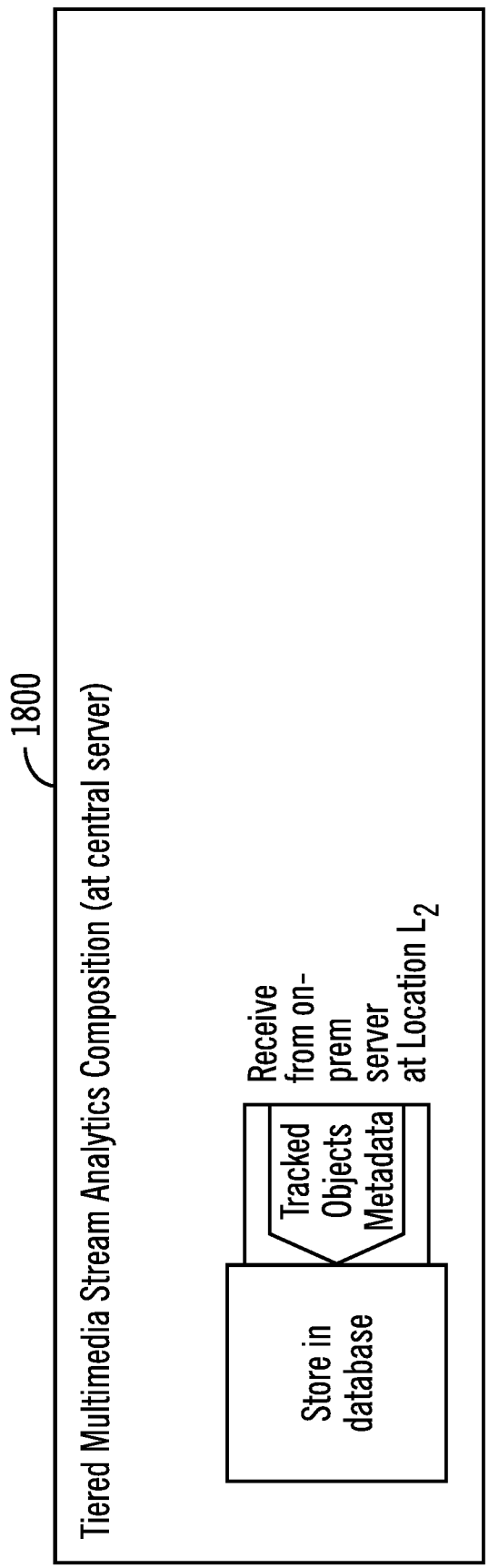
FIG. 18 illustrates, in a block diagram, tasks for the tiered composition execution at the central server in accordance with certain embodiments.

FIG. 18 illustrates, in a block diagram, tasks 1800 for the tiered composition execution 1800 at the central server in accordance with certain embodiments. In this example, the central server receives the tracked objects metadata from the on-prem server at location $L_2$ and stores the tracked objects metadata in a database.

Thus, with embodiments, the optimized configuration system 120 receives an edge topology with hardware specs, a multimedia stream analytics composition that needs to run on the edge devices, and a set of performance objectives, and then the optimized configuration system 120 recommends how to optimize the various analytic models involved in the composition, where to deploy them, and how the edge tiers should interact.

Embodiments distribute deep learning multimedia stream analytics composition tasks among or between multiple edge devices. Embodiments provide optimization of analytic models (unlike conventional systems that merely compress video or metadata).

Embodiments also allow for heterogeneous equipment to be formed into a working ensemble. For example, if a location has legacy cameras that will not be upgraded, those legacy cameras may be part of a working ensemble with updated equipment. Then, the output from those cameras may be used as input to a new object tracking analytic model.

Figure 19:
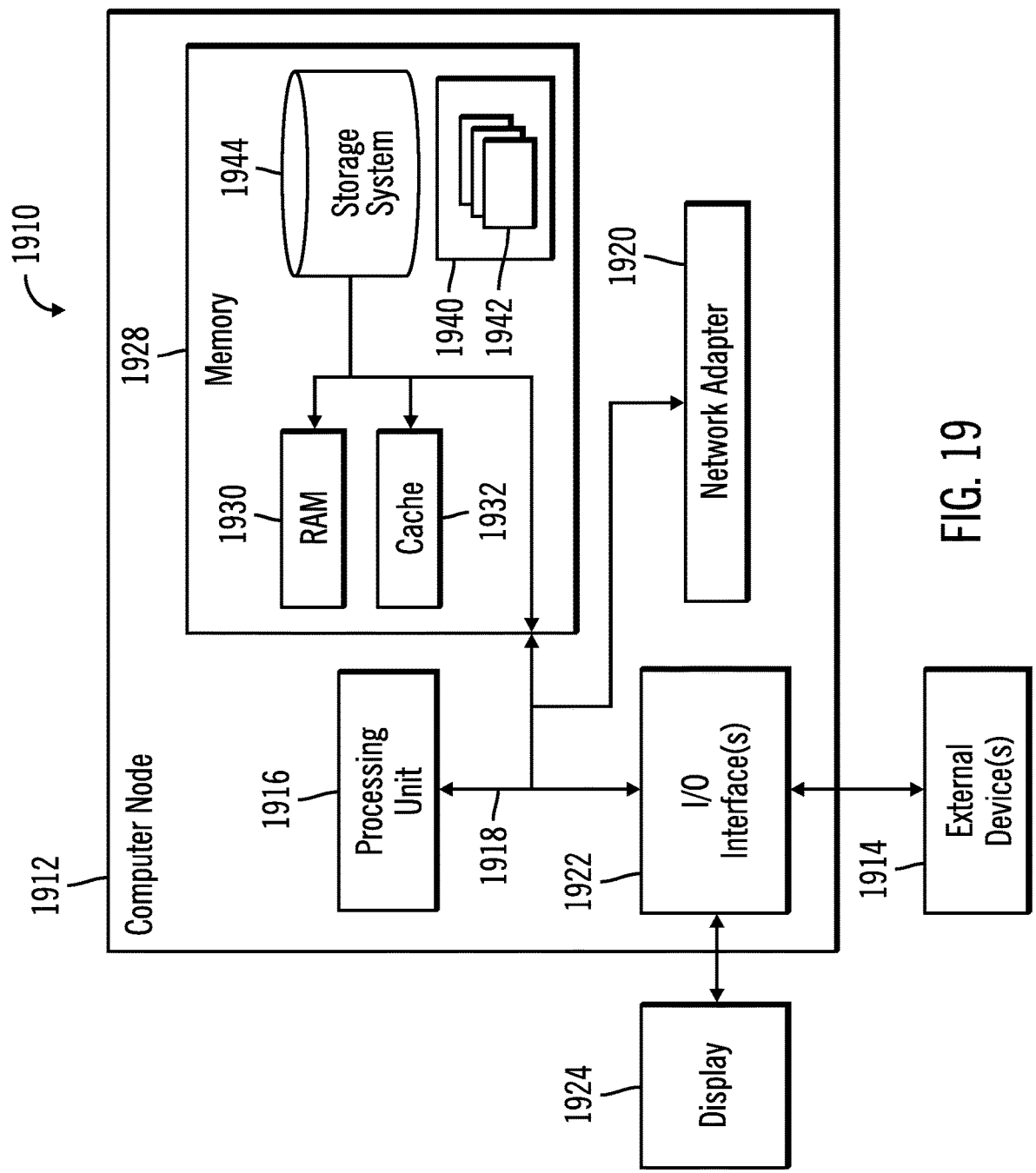
FIG. 19 illustrates a computing node in accordance with certain embodiments.

FIG. 19 illustrates a computing environment 1910 in accordance with certain embodiments. In certain embodiments, the computing environment is a cloud computing environment. Referring to FIG. 19, computer node 1912 is only one example of a suitable computing node and is not intended to suggest any limitation as to the scope of use or functionality of embodiments of the invention described herein. Regardless, computer node 1912 is capable of being implemented and/or performing any of the functionality set forth hereinabove.

The computer node 1912 may be a computer system, which is operational with numerous other general purpose or special purpose computing system environments or configurations. Examples of well-known computing systems, environments, and/or configurations that may be suitable for use with computer node 1912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1912 may be described in the general context of computer system executable instructions, such as program modules, being executed by a computer system. Generally, program modules may include routines, programs, objects, components, logic, data structures, and so on that perform particular tasks or implement particular abstract data types. Computer node 1912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer node 1912 is shown in the form of a general-purpose computing device. The components of computer node 1912 may include, but are not limited to, one or more processors or processing units 1916, a system memory 1928, and a bus 1918 that couples various system components including system memory 1928 to one or more processors or processing units 1916.

Bus 1918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1912 typically includes a variety of computer system readable media. Such media may be any available media that is accessible by computer node 1912, and it includes both volatile and non-volatile media, removable and non-removable media.

System memory 1928 can include computer system readable media in the form of volatile memory, such as random access memory (RAM) 1930 and/or cache memory 1932. Computer node 1912 may further include other removable/non-removable, volatile/non-volatile computer system storage media. By way of example only, storage system 1934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1918 by one or more data media interfaces. As will be further depicted and described below, system memory 1928 may include at least one program product having a set (e.g., at least one) of program modules that are configured to carry out the functions of embodiments of the invention.

Program/utility 1940, having a set (at least one) of program modules 1942, may be stored in system memory 1928 by way of example, and not limitation, as well as an operating system, one or more application programs, other program modules, and program data. Each of the operating system, one or more application programs, other program modules, and program data or some combination thereof, may include an implementation of a networking environment. Program modules 1942 generally carry out the functions and/or methodologies of embodiments of the invention as described herein.

Computer node 1912 may also communicate with one or more external devices 1914 such as a keyboard, a pointing device, a display 1924, etc.; one or more devices that enable a user to interact with computer node 1912; and/or any devices (e.g., network card, modem, etc.) that enable computer node 1912 to communicate with one or more other computing devices. Such communication can occur via Input/Output (I/O) interfaces 1922. Still yet, computer node 1912 can communicate with one or more networks such as a local area network (LAN), a general wide area network (WAN), and/or a public network (e.g., the Internet) via network adapter 1920. As depicted, network adapter 1920 communicates with the other components of computer node 1912 via bus 1918. It should be understood that although not shown, other hardware and/or software components could be used in conjunction with computer node 1912. Examples, include, but are not limited to: microcode, device drivers, redundant processing units, external disk drive arrays, RAID systems, tape drives, and data archival storage systems, etc.

In certain embodiments, the cameras 122, 124, 126, 128, the on-prem servers 142, 144, the central server 162, and the computing device 300 have the architecture of computer node 1912.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 20:
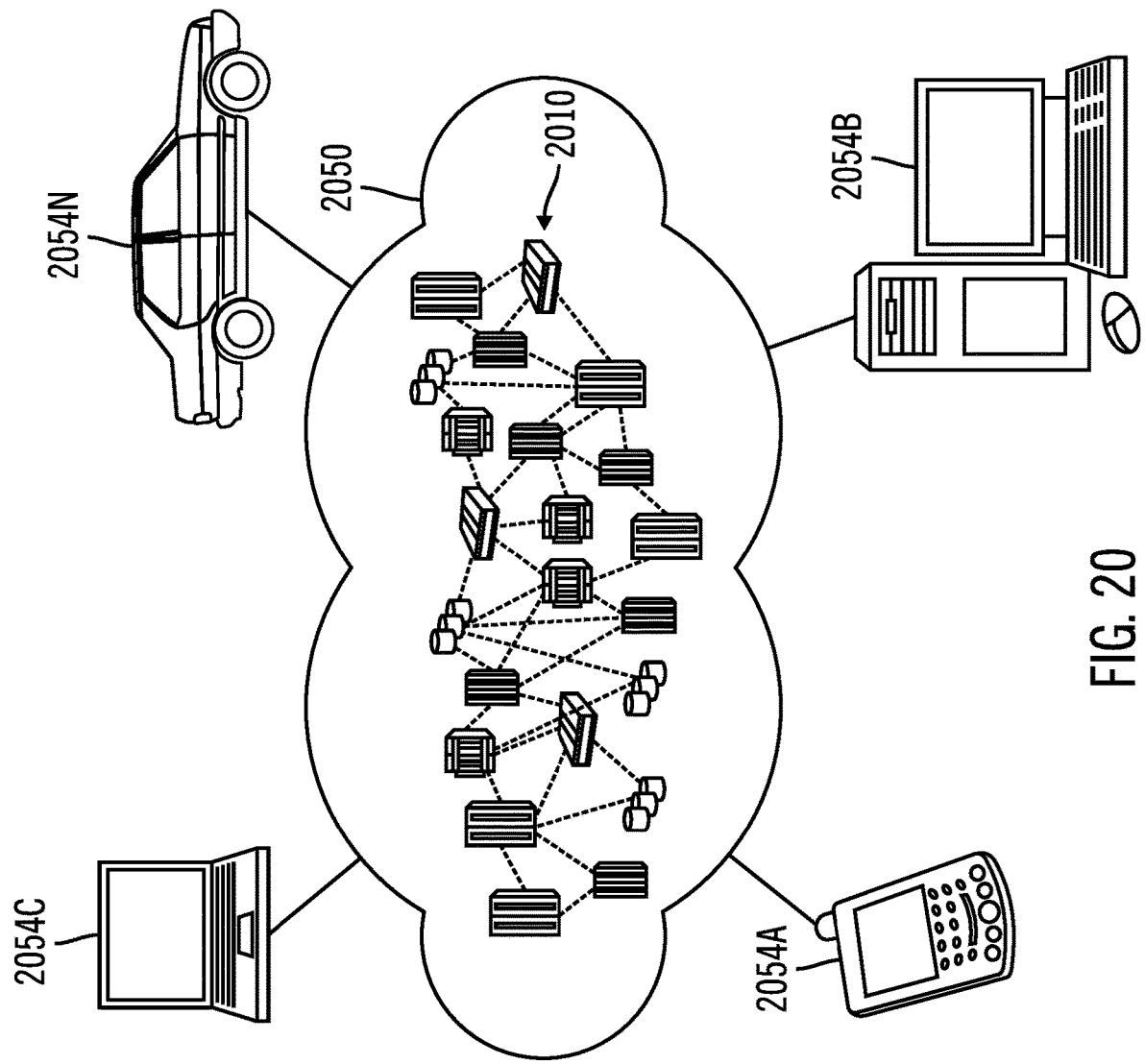
FIG. 20 illustrates a cloud computing environment in accordance with certain embodiments.

Referring now to FIG. 20, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 20 are intended to be illustrative only and that computing nodes 2010 and cloud computing environment 2050 can communicate with any type of computerized device over any type of network and/or network addressable connection (e.g., using a web browser).

Referring now to FIG. 21, a set of functional abstraction layers provided by cloud computing environment 2050 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 2160 includes hardware and software components. Examples of hardware components include: mainframes 2161; RISC (Reduced Instruction Set Computer) architecture based servers 2162; servers 2163; blade servers 2164; storage devices 2165; and networks and networking components 2166. In some embodiments, software components include network application server software 2167 and database software 2168.

Virtualization layer 2170 provides an abstraction layer from which the following examples of virtual entities may be provided: virtual servers 2171; virtual storage 2172; virtual networks 2173, including virtual private networks; virtual applications and operating systems 2174; and virtual clients 2175.

In one example, management layer 2180 may provide the functions described below. Resource provisioning 2181 provides dynamic procurement of computing resources and other resources that are utilized to perform tasks within the cloud computing environment. Metering and Pricing 2182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2183 provides access to the cloud computing environment for consumers and system administrators. Service level management 2184 provides cloud computing resource allocation and management such that required service levels are met. Service Level Agreement (SLA) planning and fulfillment 2185 provide pre-arrangement for, and procurement of, cloud computing resources for which a future requirement is anticipated in accordance with an SLA.

Workloads layer 2190 provides examples of functionality for which the cloud computing environment may be utilized. Examples of workloads and functions which may be provided from this layer include: mapping and navigation 2191; software development and lifecycle management 2192; virtual classroom education delivery 2193; data analytics processing 2194; transaction processing 2195; and optimized deployment of analytic models in an edge topology 2196.

Thus, in certain embodiments, software or a program, implementing optimized deployment of analytic models in an edge topology in accordance with embodiments described herein, is provided as a service in a cloud environment.

ADDITIONAL EMBODIMENT DETAILS

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
receiving a description of a multi-tiered edge topology with a plurality of nodes, a multimedia stream analytics composition that is executed on the plurality of nodes, and performance objectives, wherein the multimedia stream analytics composition includes tasks that use analytic models, wherein the analytic models comprise neural networks;
optimizing at least one of the analytic models to form a list of optimized analytic models by:
for each unique pair of an optimization technique of a plurality of optimization techniques and a precision of a parameter of that analytic model of a plurality of precisions,
generating an optimized analytic model based on the optimization technique and the precision; and
adding the optimized analytic model to the list;
benchmark testing the optimized analytic models on the list using test data and the plurality of nodes in the multi-tiered edge topology;
clustering the optimized analytic models on the list based on benchmark results to form clusters of optimized analytic models;
selecting a representative optimized analytic model from each of the clusters of optimized analytic models;
determining a configuration recommendation that indicates deployment of the tasks and of each selected representative optimized analytic model on the plurality of nodes to meet the performance objectives;

generating one or more workflows from the configuration recommendation to execute the tasks of the multimedia stream analytics composition on nodes of different tiers of the multi-tiered edge topology; and executing the one or more workflows on the plurality of nodes to generate output for the multimedia stream analytics composition.

2. The computer-implemented method of claim 1, wherein the performance objectives comprise any combination of accuracy, precision, recall, and throughput.

3. The computer-implemented method of claim 1, wherein optimizing the analytic models comprises compressing the analytic models.

4. The computer-implemented method of claim 1, wherein one or more of images and metadata are transmitted between the nodes of the plurality of nodes at different transmission speeds.

5. The computer-implemented method of claim 1, further comprising operations for:

for each node in the multi-tiered edge topology, defining an objective function based on performance objectives for performance, accuracy, precision, and recall;

for each node, defining a cumulative objective function based on a cumulative performance, a cumulative accuracy, a cumulative precision, and a cumulative recall; and creating an overall objective function for the multi-tiered edge topology based on the cumulative objective function of each node.

6. The computer-implemented method of claim 1, wherein the plurality of nodes includes a central server in a cloud infrastructure, wherein the central server stores one of images and metadata for the multimedia stream analytics composition in a data store.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations for:

receiving a description of a multi-tiered edge topology with a plurality of nodes, a multimedia stream analytics composition that is executed on the plurality of nodes, and performance objectives, wherein the multimedia stream analytics composition includes tasks that use analytic models, wherein the analytic models comprise neural networks;

optimizing at least one of the analytic models to form a list of optimized analytic models by:

for each unique pair of an optimization technique of a plurality of optimization techniques and a precision of a parameter of that analytic model of a plurality of precisions, generating an optimized analytic model based on the optimization technique and the precision; and adding the optimized analytic model to the list;

benchmark testing the optimized analytic models on the list using test data and the plurality of nodes in the multi-tiered edge topology;

clustering the optimized analytic models on the list based on benchmark results o form clusters of optimized analytic models;

selecting a representative optimized analytic model from each of the clusters of optimized analytic models;

determining a configuration recommendation that indicates deployment of the tasks and of each selected representative optimized analytic model on the plurality of nodes to meet the performance objectives;

generating one or more workflows from the configuration recommendation to execute the tasks of the multimedia stream analytics composition on nodes of different tiers of the multi-tiered edge topology; and executing the one or more workflows on the plurality of nodes to generate output for the multimedia stream analytics composition.

9. The computer program product of claim 8, wherein the performance objectives comprise any combination of accuracy, precision, recall, and throughput.

10. The computer program product of claim 8, wherein optimizing the analytic models comprises compressing the analytic models.

11. The computer program product of claim 8, wherein one or more of images and metadata are transmitted between the nodes of the plurality of nodes at different transmission speeds.

12. The computer program product of claim 8, wherein the program code is executable by the at least one processor to perform further operations for:

for each node in the multi-tiered edge topology, defining an objective function based on performance objectives for performance, accuracy, precision, and recall;

for each node, defining a cumulative objective function based on a cumulative performance, a cumulative accuracy, a cumulative precision, and a cumulative recall; and creating an overall objective function for the multi-tiered edge topology based on the cumulative objective function of each node.

13. The computer program product of claim 8, wherein the plurality of nodes includes a central server in a cloud infrastructure, wherein the central server stores one of images and metadata for the multimedia stream analytics composition in a data store.

14. The computer program product of claim 8, wherein a Software as a Service (SaaS) is configured to perform the operations of the computer program product.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

receiving a description of a multi-tiered edge topology with a plurality of nodes, a multimedia stream analytics composition that is executed on the plurality of nodes, and performance objectives, wherein the multimedia stream analytics composition includes tasks that use analytic models, wherein the analytic models comprise neural networks;

optimizing at least one of the analytic models to form a list of optimized analytic models by:

for each unique pair of an optimization technique of a plurality of optimization techniques and a precision of a parameter of that analytic model of a plurality of precisions, generating an optimized analytic model based on the optimization technique and the precision; and adding the optimized analytic model to the list;

benchmark testing the optimized analytic models on the list using test data and the plurality of nodes in the multi-tiered edge topology;

clustering the optimized analytic models on the list based on benchmark results to form clusters of optimized analytic models;

selecting a representative optimized analytic model from each of the clusters of optimized analytic models;

determining a configuration recommendation that indicates deployment of the tasks and of each selected representative optimized analytic model on the plurality of nodes to meet the performance objectives;

generating one or more workflows from the configuration recommendation to execute the tasks of the multimedia stream analytics composition on nodes of different tiers of the multi-tiered edge topology; and executing the one or more workflows on the plurality of nodes to generate output for the multimedia stream analytics composition.

16. The computer system of claim 15, wherein the performance objectives comprise any combination of accuracy, precision, recall, and throughput.

17. The computer system of claim 15, wherein optimizing the analytic models comprises compressing the analytic models.

18. The computer system of claim 15, wherein one or more of images and metadata are transmitted between the nodes of the plurality of nodes at different transmission speeds.

19. The computer system of claim 15, wherein the operations further comprise:

for each node in the multi-tiered edge topology, defining an objective function based on performance objectives for performance, accuracy, precision, and recall;

for each node, defining a cumulative objective function based on a cumulative performance, a cumulative accuracy, a cumulative precision, and a cumulative recall; and creating an overall objective function for the multi-tiered edge topology based on the cumulative objective function of each node.

20. The computer system of claim 15, wherein the plurality of nodes includes a central server in a cloud infrastructure, wherein the central server stores one of images and metadata for the multimedia stream analytics composition in a data store.

21. The computer system of claim 15, wherein a Software as a Service (SaaS) is configured to perform the operations of the computer system.

22. The computer-implemented method of claim 1, further comprising operations for:

performing fine-tuning by trying different combinations of representative optimized analytic models from each of the clusters of optimized analytic models.

23. The computer program product of claim 8, wherein the program code is executable by the at least one processor to perform further operations for:

performing fine-tuning by trying different combinations of representative optimized analytic models from each of the clusters of optimized analytic models.

24. The computer system of claim 15, wherein the operations further comprise:

performing fine-tuning by trying different combinations of representative optimized analytic models from each of the clusters of optimized analytic models.

* * * * *